US007587512B2

(12) United States Patent
Ta et al.

(10) Patent No.: US 7,587,512 B2
(45) Date of Patent: Sep. 8, 2009

(54) SYSTEM AND METHOD FOR DYNAMIC BANDWIDTH PROVISIONING

(75) Inventors: Tuan Ta, Austin, TX (US); Patrick Turley, Austin, TX (US); Kerry Clendinning, Austin, TX (US); Kelly Looney, Austin, TX (US)

(73) Assignee: Eric White, Austin, TX (US)

( * ) Notice: Subject to any disclaimer, the term of this patent is extended or adjusted under 35 U.S.C. 154(b) by 725 days.

(21) Appl. No.: 10/687,002

(22) Filed: Oct. 16, 2003

(65) Prior Publication Data

US 2004/0199635 A1 Oct. 7, 2004

Related U.S. Application Data

(60) Provisional application No. 60/418,968, filed on Oct. 16, 2002.

(51) Int. Cl.
G06F 13/00 (2006.01)
(52) U.S. Cl. .................. 709/233; 709/226; 709/229
(58) Field of Classification Search .................. 709/226, 709/229, 231–233, 225
See application file for complete search history.

(56) References Cited

U.S. PATENT DOCUMENTS

| 5,673,393 | A | 9/1997 | Marshall et al. |
| 5,706,427 | A | 1/1998 | Tabuki |
| 5,748,901 | A | 5/1998 | Afek et al. |
| 5,878,231 | A | 3/1999 | Baehr et al. |
| 5,896,499 | A | 4/1999 | McKelvey |
| 5,901,148 | A | 5/1999 | Bowen et al. |
| 5,936,542 | A | 8/1999 | Kleinrock et al. |
| 5,953,506 | A | 9/1999 | Kalra et al. |
| 5,987,134 | A | 11/1999 | Shin et al. |
| 5,996,013 | A | 11/1999 | Delp et al. |
| 6,085,241 | A | 7/2000 | Otis |
| 6,088,451 | A | 7/2000 | He et al. |

(Continued)

FOREIGN PATENT DOCUMENTS

EP 0587522 B1 1/2000

(Continued)

OTHER PUBLICATIONS

International Search Report for PCT/US03/32912 mailed Apr. 8, 2004.

(Continued)

*Primary Examiner*—Kenneth R Coulter
(74) *Attorney, Agent, or Firm*—Sprinkle IP Law Group

(57) ABSTRACT

One embodiment of the present invention provides a device for allocating bandwidth on a per user basis. The device can be a computing device that comprises a processor, a first network interface coupled to the processor, a second network interface coupled to the processor, and a storage medium accessible by the processor that contains a set of computer instructions. The computer instructions can be executable by the processor to retrieve a set of user profiles. Based on the user profile for each user, the computer instructions can be executable to establish at least one bandwidth limit for each user. For each user, the computer instructions can be further executable to regulate bandwidth usage associated with that user based on the at least one bandwidth limit established for that user. The computer instructions can also be executable to update the at least one bandwidth limit.

60 Claims, 8 Drawing Sheets

U.S. PATENT DOCUMENTS

| | | | |
|---|---|---|---|
| 6,092,200 A | 7/2000 | Muniyappa et al. | |
| 6,108,782 A | 8/2000 | Fletcher et al. | |
| 6,130,892 A | 10/2000 | Short et al. | |
| 6,131,116 A | 10/2000 | Riggins et al. | |
| 6,157,953 A | 12/2000 | Chang et al. | |
| 6,173,331 B1 | 1/2001 | Shimonishi | |
| 6,176,883 B1 | 1/2001 | Holloway et al. | |
| 6,185,567 B1 | 2/2001 | Ratnaraj et al. | |
| 6,194,992 B1 | 2/2001 | Short et al. | |
| 6,205,552 B1 | 3/2001 | Fudge | |
| 6,212,558 B1 | 4/2001 | Antur et al. | |
| 6,233,607 B1 | 5/2001 | Taylor et al. | |
| 6,243,815 B1 | 6/2001 | Antur et al. | |
| 6,275,693 B1 | 8/2001 | Lin et al. | |
| 6,295,294 B1 | 9/2001 | Odlyzko | |
| 6,321,339 B1 | 11/2001 | French et al. | |
| 6,324,648 B1 | 11/2001 | Grantges, Jr. | |
| 6,336,133 B1 | 1/2002 | Morris et al. | |
| 6,404,743 B1 | 6/2002 | Meandzija | |
| 6,421,319 B1 | 7/2002 | Iwasaki | |
| 6,463,474 B1 | 10/2002 | Fuh et al. | |
| 6,473,793 B1 | 10/2002 | Dillon et al. | |
| 6,473,801 B1 | 10/2002 | Basel | |
| 6,477,143 B1 | 11/2002 | Ginossar | |
| 6,502,131 B1 | 12/2002 | Vaid et al. | |
| 6,516,417 B1 | 2/2003 | Pegrum et al. | |
| 6,535,879 B1 | 3/2003 | Behera | |
| 6,539,431 B1 | 3/2003 | Sitaraman et al. | |
| 6,678,733 B1 | 1/2004 | Brown et al. | |
| 6,708,212 B2 | 3/2004 | Porras et al. | |
| 6,732,179 B1 | 5/2004 | Brown et al. | |
| 6,735,691 B1 | 5/2004 | Capps et al. | |
| 6,757,740 B1 * | 6/2004 | Parekh et al. | 709/245 |
| 6,785,252 B1 * | 8/2004 | Zimmerman et al. | 370/337 |
| 6,804,783 B1 | 10/2004 | Wesinger et al. | |
| 6,823,385 B2 * | 11/2004 | McKinnon et al. | 709/226 |
| 6,917,622 B2 * | 7/2005 | McKinnon et al. | 370/420 |
| 7,013,331 B2 | 3/2006 | Das | |
| 7,143,283 B1 | 11/2006 | Chen et al. | |
| 7,146,639 B2 | 12/2006 | Bartal et al. | |
| 7,181,017 B1 | 2/2007 | Nagel et al. | |
| 7,272,646 B2 | 9/2007 | Cooper et al. | |
| 7,324,947 B2 | 1/2008 | Jordan et al. | |
| 7,325,042 B1 | 1/2008 | Soscia et al. | |
| 7,406,530 B2 | 7/2008 | Brown et al. | |
| 7,420,956 B2 | 9/2008 | Karaoguz et al. | |
| 2001/0038639 A1 * | 11/2001 | McKinnon et al. | 370/468 |
| 2001/0038640 A1 * | 11/2001 | McKinnon et al. | 370/468 |
| 2001/0038645 A1 * | 11/2001 | McKinnon et al. | 370/490 |
| 2001/0039576 A1 | 11/2001 | Kanada | |
| 2001/0039582 A1 * | 11/2001 | McKinnon et al. | 709/226 |
| 2002/0013844 A1 | 1/2002 | Garrett et al. | |
| 2002/0021665 A1 | 2/2002 | Bhagavath et al. | |
| 2002/0023160 A1 | 2/2002 | Garrett et al. | |
| 2002/0029260 A1 * | 3/2002 | Dobbins et al. | 709/219 |
| 2002/0035699 A1 | 3/2002 | Crosbie | |
| 2002/0042883 A1 | 4/2002 | Roux et al. | |
| 2002/0046264 A1 | 4/2002 | Dillon et al. | |
| 2002/0052950 A1 | 5/2002 | Pillai et al. | |
| 2002/0055968 A1 | 5/2002 | Wishoff et al. | |
| 2002/0059408 A1 | 5/2002 | Pattabhiraman et al. | |
| 2002/0075844 A1 * | 6/2002 | Hagen | 370/351 |
| 2002/0085719 A1 | 7/2002 | Crosbie | |
| 2002/0087713 A1 | 7/2002 | Cunningham | |
| 2002/0090089 A1 | 7/2002 | Branigan et al. | |
| 2002/0091944 A1 | 7/2002 | Anderson et al. | |
| 2002/0112183 A1 | 8/2002 | Baird, III et al. | |
| 2002/0112186 A1 | 8/2002 | Ford et al. | |
| 2002/0120741 A1 | 8/2002 | Webb et al. | |
| 2002/0123335 A1 | 9/2002 | Luna et al. | |
| 2002/0124078 A1 | 9/2002 | Conrad | |
| 2002/0124103 A1 | 9/2002 | Maruyama et al. | |
| 2002/0129143 A1 | 9/2002 | McKinnon, III et al. | |
| 2002/0131404 A1 | 9/2002 | Mehta et al. | |
| 2002/0133581 A1 | 9/2002 | Schwartz et al. | |
| 2002/0133589 A1 | 9/2002 | Gubbi et al. | |
| 2002/0136226 A1 | 9/2002 | Christoffel et al. | |
| 2002/0138762 A1 | 9/2002 | Horne | |
| 2002/0138763 A1 | 9/2002 | Delaney et al. | |
| 2002/0143964 A1 | 10/2002 | Guo et al. | |
| 2002/0152284 A1 | 10/2002 | Cambray et al. | |
| 2002/0162030 A1 | 10/2002 | Brezak et al. | |
| 2002/0164952 A1 | 11/2002 | Singhal et al. | |
| 2002/0165990 A1 | 11/2002 | Singhai et al. | |
| 2002/0169867 A1 | 11/2002 | Mann et al. | |
| 2002/0174227 A1 | 11/2002 | Hartsell et al. | |
| 2002/0178282 A1 | 11/2002 | Mysore et al. | |
| 2002/0199007 A1 | 12/2002 | Clayton et al. | |
| 2003/0041104 A1 | 2/2003 | Wingard et al. | |
| 2003/0043846 A1 | 3/2003 | Purpura et al. | |
| 2003/0046370 A1 | 3/2003 | Courtney | |
| 2003/0055994 A1 | 3/2003 | Herrmann et al. | |
| 2003/0059038 A1 | 3/2003 | Meyerson et al. | |
| 2003/0069956 A1 | 4/2003 | Gieseke et al. | |
| 2003/0070170 A1 | 4/2003 | Lennon | |
| 2003/0078784 A1 | 4/2003 | Jordan et al. | |
| 2003/0087629 A1 | 5/2003 | Juitt et al. | |
| 2003/0126608 A1 | 7/2003 | Safadi et al. | |
| 2003/0135753 A1 | 7/2003 | Batra et al. | |
| 2003/0149751 A1 | 8/2003 | Bellinger et al. | |
| 2003/0159072 A1 | 8/2003 | Bellinger et al. | |
| 2003/0163603 A1 | 8/2003 | Fry et al. | |
| 2003/0172167 A1 | 9/2003 | Judge et al. | |
| 2003/0177477 A1 | 9/2003 | Fuchs | |
| 2003/0212800 A1 | 11/2003 | Jones et al. | |
| 2003/0217126 A1 | 11/2003 | Polcha et al. | |
| 2004/0049586 A1 | 3/2004 | Ocepek et al. | |
| 2004/0064836 A1 | 4/2004 | Ludvig et al. | |
| 2004/0073941 A1 | 4/2004 | Ludvig et al. | |
| 2004/0103426 A1 | 5/2004 | Ludvig et al. | |
| 2004/0122956 A1 | 6/2004 | Myers et al. | |
| 2004/0177276 A1 | 9/2004 | MacKinnon et al. | |
| 2004/0179822 A1 | 9/2004 | Tsumagari et al. | |
| 2004/0181816 A1 | 9/2004 | Kim et al. | |
| 2004/0199635 A1 | 10/2004 | Ta et al. | |
| 2004/0210633 A1 | 10/2004 | Brown et al. | |
| 2004/0268234 A1 | 12/2004 | Sampathkumar et al. | |
| 2005/0021686 A1 | 1/2005 | Jai et al. | |
| 2005/0044350 A1 | 2/2005 | White et al. | |
| 2005/0138416 A1 | 6/2005 | Qian et al. | |
| 2005/0193103 A1 | 9/2005 | Drabik | |
| 2005/0195854 A1 | 9/2005 | Agmon et al. | |
| 2005/0204022 A1 | 9/2005 | Johnston et al. | |
| 2005/0204031 A1 | 9/2005 | Johnston et al. | |
| 2005/0204050 A1 | 9/2005 | Turley | |
| 2005/0204168 A1 | 9/2005 | Johnston et al. | |
| 2005/0204169 A1 | 9/2005 | Tonnesen | |
| 2005/0204402 A1 | 9/2005 | Turley et al. | |
| 2005/0205168 A1 | 9/2005 | Johnston et al. | |
| 2006/0036723 A1 | 2/2006 | Yip et al. | |
| 2006/0168229 A1 | 7/2006 | Shim et al. | |
| 2006/0184618 A1 | 8/2006 | Kurup et al. | |
| 2007/0073718 A1 | 3/2007 | Ramer et al. | |
| 2007/0186113 A1 | 8/2007 | Cuberson et al. | |
| 2007/0208936 A1 | 9/2007 | Ramos Robles | |
| 2007/0268878 A1 | 11/2007 | Clements | |
| 2008/0066096 A1 | 3/2008 | Wollmershauser et al. | |
| 2008/0120661 A1 | 5/2008 | Ludvig et al. | |
| 2008/0147840 A1 | 6/2008 | Roelens et al. | |
| 2008/0276305 A1 | 11/2008 | Chan et al. | |

FOREIGN PATENT DOCUMENTS

| | | | |
|---|---|---|---|
| WO | WO 0177787 A2 | 10/2001 | |

| | | |
|---|---|---|
| WO | WO 0209458 A2 | 1/2002 |
| WO | WO 02/23825 A1 | 3/2002 |
| WO | WO 0241587 A3 | 5/2002 |
| WO | WO 02077820 A1 | 10/2002 |
| WO | WO 03021890 A1 | 3/2003 |
| WO | WO 03/098461 A1 | 5/2003 |
| WO | WO 04/034229 | 4/2004 |
| WO | WO 04/036371 | 4/2004 |
| WO | WO 05/020035 | 3/2005 |

OTHER PUBLICATIONS

Pending U.S. Appl. No. 09/458,602, Pagan et al.
Pending U.S. Appl. No. 09/541,877, Short et al.
Pending U.S. Appl. No. 09/458,569, Short et al.
Pending U.S. Appl. No. 08/816,174, Short et al.
Lingblom, "Cranite Develops SMB Stategy", CRN, San Jose, CA, Jun. 23, 2003.
"Boingo Wireless Service Installed At LaGuardia Airport" Copyright 2003 M2Communications Ltd., found at www.findarticles.com, 1 page, printed Dec. 8, 2003.
"West Point Unwired: the Military Academy at West Point Continues to Lead the Way in High-Tech Curriculum with Wireless Classroom Networking" Copyright 2003 M2Communications Ltd., found at www.findarticles.com, 1 page, printed Dec. 8, 2003.
Molta, "Wireless Hotspots Heat Up", Mobile & Wireless Technology feature, pp. 1-8, Copyright 2003 M2Communications Ltd., found at www.networkcomputing.com, printed Dec. 8, 2003.
Jackson, "Wireless at West Point: Officers of the Future Use IT in Class Now, in the Field Later (technology Report)" pp. 1-3, www.gcn.com, Apr. 21, 2003.
Lingblom, "Bluesocket's New Gateway Based on Open Standards—WGX-4000 Switch Wireless Gateway" CRN, Burlington, MA, found at www.crn.channelsupersearch.com, Apr. 21, 2003.
Dornan, "Wireless LANs: Freedom vs. Security?" Network Magazine, pp. 36-39, Jul. 2003.
O'Shea, "PCTEL looks past patent suite toward fusion of Wi-Fi, PC" Telephony.online, pp. 1-2, found at www.telephonyonline.com, Jun. 2, 2003.
O'Shea, "Boingo to Launch Initiative Aimed at Carrier Market" Telephony.online, 1 page, found at www.telephonyonline.com, Mar. 10, 2003.
U.S. Appl. No. 09/821,565, Ishikawa.
U.S. Appl. No. 09/881,147, Cooper et al.
U.S. Appl. No. 10/000,396, Copeland.
U.S. Appl. No. 10/072,683, Zuk et al.
U.S. Appl. No. 10/195,326, Lee et al.
U.S. Appl. No. 10/236,402, Bauer.
U.S. Appl. No. 10/291,095, Cantrell et al.
U.S. Appl. No. 10/469,206, Ohtani et al.
U.S. Appl. No. 10/641,494, Valluri.
U.S. Appl. No. 10/643,864, Nakae et al.
U.S. Appl. No. 10/709,423, Lu et al.
U.S. Appl. No. 10/930,392, Cantrell et al.
U.S. Appl. No. 10/953,326, Suzuki.
U.S. Patent Office Action issued Jun. 9, 2008, in U.S. Appl. No. 10/683,317, Richard MacKinnon, 15 pages.
Fan et al, "Distributed Real Time Intrusion Detection System for 3G", 2004, pp. 1566-1570.
Yu et al., "Fuzzy Logic Based Adaptive Congestion Control Scheme for High-Speed Network", Aug. 2004, pp. 389-393.
Hamano et al., A Redirections-Based Defense Mechanism Against Flood-Type Attacks in Large Scale ISP Networks, 2004, pp. 543-547.
Sarolahti, "Congestion Control on Spurious TCP Retransmssion Timeouts," 2003, pp. 682-686.
Estevez-Tapiador et al., "Measuring Normality in HTTP Traffic for Anomaly-Based Intrusion Dectection", Jun. 6, 2004, pp. 175-193.
Xing et al., "A Survery of Computer Vulnerability Assessment", Jan. 2004, pp. 1-11.
Wen et al. "Development of a Snort-Based Security Network Management and Real-Time Intrusion Detection System", Feb. 2004, pp. 40-43.
Thottethodi et al., "Exploiting Global Knowledge to Achieve Self-Tuned Congestion Control for K-ary n-cube Networks", Mar. 2004, pp. 257-272.
Trabelsi et al., "Malicious Sniffing Systems Detection Platform", 2004, pp. 201-207.
Guangzhi et al., "A Framework for Network Vulnerability Analysis", 2002, pp. 289-294.
Albuquerque et al., "Network Border Patrol: Preventing Congestion Collapse and Promoting Fairness in the Internet", Feb. 2004, pp. 173-186.
Wirbel, Loring, "Security Stampede Could Flatten IPSec", Jan. 2004, p. 12.
Macleod, Calum, "Freeing the Shackles with Secure Remote Working", 2003, pp. 66-67.
Fisher, D., "SSL Simplifies VPN Security", Nov. 10, 2003, p. 40.
Conry-Murray, A., "SSL VPNs: Remote Access for the Masses", Oct. 2003, pp. 26-32.
Permeo Supports Microsoft Network Access Protection for Simplified Secure remote Access; Permeo's Base5 Support for Microsoft Tech. Provides "Zero Touch" Policy Enforcement, Apr. 25, 2005.
No author, Permeo Drives Out Operational Costs, Simplifies Secure Remote Access, Mar. 28, 2005, pages NA.
No Author, Netilla Launches SSL VPN for Citrix. (Industry Briefs) (Virtual Private Networks) (Brief Article), Sep. 20, 2004, p. 43.
Netilla Launches Secure Gateway Appliance Family of Application-Specific SSL VPN Products; Initial SGA-C Model Provides Secure Remote Access to Citrix MetaFrame Presentation, Sep. 13, 2004.
No author, "Secure Remote Access (Network Security) (VPN Gateway 4400 Series) (Brief Article)", Mar. 1, 2004, p. 50.
Fortinet and Aventail Deliver Joint Solution for Clientless Remote Access with High-Performance Antivirus Protection; Integrated SSL VPN and Antivirus Offering Provides, Jan. 5, 2004.
Hamblen, Matt, "Cisco Targets SSL VPN Vendors, Adds Support for Clientless Security Protoccol: Installed Base of VPN Devices May Gives it an Edge, Despite Late Entry (News)", 2003.
International Search Report and Written Opinion for related International Application No. PCT/US04/29249, Dec. 15, 2005.
Stone, David, "Securing Wireless LANs with VPN," May 2006, pages NA.
Hamzeh, et al., "Point-to-Point Tunneling Protocol—PPTP RFC 2637" Network Working Group, Jul. 1999, pp. 1-54.
Pfleeger, Charles P., Security in Computing, PTR Prentice-Hall, Inc., 1989, Ch. 10.
International Search Report for PCT/US03/32268 dated Oct. 29, 2004.
U.S. Patent Office Official Action issued Jan. 25, 2008 in U.S. Appl. No. 11/076,652, Steven D. Tonnesen.
U.S. Patent Office Action issued Jul. 22, 2008, in U.S. Appl. No. 11/076,652, Steven D. Tonnesen, 8 pages.
U.S. Patent Office Action issued Jul. 9, 2008, in U.S. Appl. No. 11/076,672, Keith Johnston.
U.S. Patent Office Action issued Aug. 13, 2008, in U.S. Patent Appl. No. 11/076,591, Patrick Turley, 10 pages.
U.S. Patent Office Official Action issued Oct. 9, 2007 in U.S. Appl. No. 10/683,317, Richard MacKinnon, Oct. 9, 2007.
U.S. Patent Office Official Action issued Jul. 13, 2007 in U.S. Appl. No. 10/922,041, Eric White, Jul. 13, 2007.
U.S. Patent Office Official Action issued Oct. 31, 2007 in U.S. Appl. No. 11/078,223, Keith Johnston, Oct. 31, 2007.
Office Action issued in U.S. Appl. No. 11/076,719, dated Sep. 4, 2008, Turley, 7 pages.
SBC Technology Resources, Inc., XNMP-XML Network Management Protocol and Interface, Jul. 19, 2002, pp. 1-9, http://www.letf.org/proceedings/02jul/slides.
Shim, Choon B., XNMP for IP Telephony Management, Enterprise Networks & Servers, Jun. 2006, pp. 1-7, http://www.enterprisenetworksandservers.com.
International Preliminary Report on Patentability in PCT/US03/032268 dated Apr. 10, 2005, 3 pages.
International Preliminary Report on Patentability in PCT/US03/032912 dated Apr. 16, 2005, 3 pages.
International Preliminary Report on Patentability in PCT/USO4/029249 dated Feb. 21, 2006, 1 page.

Written Opinion of the International Searching Authority in PCT/US04/029249 dated Dec. 15, 2005, 5 pages.

Oh et al., Interaction Translation Methods for XML/SNMP Gateway, Jul. 11, 2003, retrieved from . . . (citation continued in next line) . . . http://web-archive.org/web/20030711162412/http://dpnm.postech.ac.kr/paper s/DSOM/02/xml-snmp-gateway/xml-snmp-gateway.pdf, 12 pages.

Office Action issued in U.S. Appl. No. 11/076,672 dated Feb. 03, 2009, Johnston, 10 pages.

Office Action issued in U.S. Appl. No. 10/683,317 dated Feb. 11, 2009, MacKinnon, 17 pages.

Office Action issued in U.S. Appl. No. 11/076,591 dated Feb. 13, 2009, Turley, 26 pages.

Office Action issued in U.S. Appl. No. 11/076,719 dated Mar. 17, 2009, Turley, 8 pages.

Office Action issued in U.S. Appl. No. 10/922,041, mailed Dec. 06, 2005, White, 10 pages.

Office Action issued in U.S. Appl. No. 10/922,041, mailed Mar. 30, 2006, White, 18 pages.

Office Action issued in U.S. Appl. No. 10/922,041, mailed Aug. 11, 2006, White, 19 pages.

Office Action issued in U.S. Appl. No. 10/922,041, mailed Jan. 30, 2007, White, 20 pages.

Office Action issued in U.S. Appl. No. 10/683,317, mailed Apr. 05, 2007, MacKinnon, 6 pages.

U.S. Patent Office Official Action issued May 8, 2009 U.S. Appl. No. 10/922,041. Eric White.

* cited by examiner

SYSTEM AND METHOD FOR DYNAMIC BANDWIDTH PROVISIONING

RELATED APPLICATIONS

This application claims priority under 35 U.S.C. 119(e) to U.S. Provisional Patent Application No. 60/418,968, entitled "System and Method for Dynamic Bandwidth Shaping," to Kerry Clendenning, et al., filed Oct. 16, 2002, which is hereby fully incorporated by reference herein.

TECHNICAL FIELD OF THE INVENTION

Embodiments of the present invention relate to providing network access. More particularly, embodiments of the present invention relate to provisioning bandwidth to users accessing a network. Even more particularly, embodiments of the present invention relate to dynamically provisioning bandwidth on a per user basis.

BACKGROUND

The communication of data over networks has become an important, if not essential, way for many organizations and individuals to communicate. The Internet is a global network connecting millions of computers using a client-server architecture in which any computer connected to the Internet can potentially receive data from and send data to any other computer connected to the Internet. The Internet provides a variety methods in which to communicate data, one of the most ubiquitous of which is the World Wide Web. Other methods for communicating data over the Internet include e-mail, usenet newsgroups, telnet and FTP.

Users typically access the Internet either through a computer connected to an Internet Service Provider ("ISP") or computer connected to a local area network ("LAN") provided by an organization, which is in turn, connected to the ISP. The ISP provides a point of presence to interface with the Internet backbone. Routers and switches in the backbone direct data traffic between the various ISPs.

To access a LAN and, in turn, the Internet, many prior art access control systems require a user to connect his or her computer to a wired network (e.g., through an Ethernet port) and enter a user name and password. If the user name and password match a user name and password in an authentication database, the user will be provided access to the network. These systems typically assume that a user is tied to a particular physical port, such as a port in the user's office. Based on this assumption, provisioning of bandwidth to the user occurs by physically provisioning the port to which the user is connected. If the user moves to a different port, the user will typically be provided with the bandwidth provisioned to the new port. Thus, provisioning of bandwidth is done on a per port rather than a per user basis.

An increasing number of organizations (e.g., businesses, governmental organizations) wish to provide access to LANs and the Internet to various classes of users (internal users, contractors, customers, visitors). For example, many cafés have public wireless networks to allow patrons to access the Internet, receive email and perform other network activities. While users may be asked to authenticate to use the network, bandwidth is provisioned to the wireless routers, not the individual users. This means that one user connected to a particular router can consume a majority of the bandwidth (e.g., downloading pictures from the Internet), slowing down the wireless network for other users connected to that router.

Because bandwidth is provisioned on a per port rather than per user basis, current systems can not reprovision bandwidth to particular users as more users are added to the same port (e.g., as more users connect to the same wireless router). Continuing with the previous example of a public wireless LAN at a café, current systems can not reprovision bandwidth to individual users as more café patrons connect to the LAN. This can cause LAN performance to suffer for all users.

SUMMARY OF THE INVENTION

Embodiments of the present invention provide a system and method of providing bandwidth allocation that eliminates, or at least substantially reduces, the shortcomings of prior art bandwidth provisioning systems and methods. More particularly, one embodiment of the present invention provides a device for allocating bandwidth on a per user basis. The device can be a computing device that comprises a processor, a first network interface (e.g., an Ethernet interface, T1 interface, wireless interface or any other network interface known in the art) coupled to the processor, a second network interface (e.g., an Ethernet interface, T1 interface, wireless interface or any other network interface known in the art) coupled to the processor, and a storage medium (e.g., hard disk drive, RAM, ROM, optical storage and or any other storage medium known in the art). The storage medium can be accessible by the processor and can contain a set of computer instructions.

The computer instructions, according to one embodiment of the present invention, can be executable by the processor to retrieve a set of user profiles, wherein each user profile corresponds to a specific user in a set of users. Each user profile can contain an arbitrary number of attributes that can specify bandwidth limitations for the corresponding user. Based on the user profile for each user, the computer instructions can be executable to establish at least one bandwidth limit for each user and control bandwidth usage by that user accordingly. The computer instructions can also be executable to update the at least one bandwidth limit for one or more users.

Another embodiment of the present invention can include computer instructions stored on a computer readable medium (e.g., RAM, ROM, hard disk drive, magnetic storage device, optical storage device or other computer readable medium known in the art). The computer instructions can be executable by a processor to retrieve a set of user profiles, wherein each user profile corresponds to a specific user in a set of users. Each user profile can contain an arbitrary number of attributes that can specify bandwidth limitations for the corresponding user. Based on the user profile for each user, the computer instructions can be executable to establish at least one bandwidth limit for each user. For each user in the set of users, the computer instructions can be further executable to regulate bandwidth usage associated with that user based on the at least one bandwidth limit established for that user. The computer instructions can also be executable to update the at least one bandwidth limit for one or more of the users.

Yet another embodiment of the present invention can include a method comprising retrieving a set of user profiles, wherein each user profile corresponds to a specific user in a set of users; establishing at least one bandwidth limit for each user in the set of users based on the corresponding user profile for that user; for each user in the set of users, regulating bandwidth usage associated with that user based on the at least one bandwidth limit established for that user; and updating the at least one bandwidth limit for at least one user from the set of users.

Yet another embodiment of the present invention comprises computer instructions stored on a computer readable medium (e.g., RAM, ROM, hard disk drive, magnetic storage device, optical storage device or other computer readable medium known in the art). The computer instructions can be executable by a processor to establish a bandwidth limit for a user based on a user profile for the user; receive a first network communication; determine if the first network communication causes the bandwidth limit to be exceeded; if the first network communication causes the bandwidth limit to be exceeded, drop the network communication; and update the bandwidth limit for the user.

Embodiments of the present invention provide an advantage over prior art bandwidth allocation systems and methods by allowing bandwidth to be provisioned and dynamically updated on per user basis.

Embodiments of the present invention provide another advantage over prior art bandwidth allocation systems and methods by allowing bandwidth usage to be metered on a per user basis.

Embodiments of the present invention provide another advantage by allowing users to be allocated a predefined amount of bandwidth on wired and wireless networks.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the invention are illustrated in the figures, like numerals being used to refer to like and corresponding parts of the various drawings.

Embodiments of the present invention provide a system and method for providing bandwidth shaping on a per user basis. For purposes of this application, "bandwidth shaping" refers to the process of determining bandwidth allocations. According to one embodiment of the present invention, a control device can be located between a network (e.g., the Internet, a LAN or other network known in the art) and users. The users themselves may be located on a network or subnet or may connect directly to the control device. When a particular user attempts to access the network behind the control device (i.e., the controlled network), the control device can assign a bandwidth to the user based on a user profile. As more users attempt to access the controlled network through the control device, the control device can dynamically alter the bandwidth allocations among users. Additionally, the control device can reallocate bandwidth on a per user basis to account for various factors, such as time of day, burstiness or other such factors known in the art.

By way of example, but not limitation, a control device can be coupled to a public wired or wireless LAN and the Internet to provide users with access to the Internet. When a user attempts to access the Internet over the public LAN, the control device can retrieve a user profile for the user and assign a bandwidth to the user. As additional users attempt to access the Internet, the control device can reassign bandwidths to the user.

Embodiments of the present invention provide an advantage over prior art bandwidth shaping systems and methods by allocating bandwidth on a per user basis. Additionally, embodiments of the present invention provide an advantage by allowing the bandwidth allocations to be dynamically altered to account for, for example, changes in network state, user activity or number of users. Embodiments of the present invention can allocate and dynamically shape bandwidth for both wired and/or wireless networks.

Figure 1:
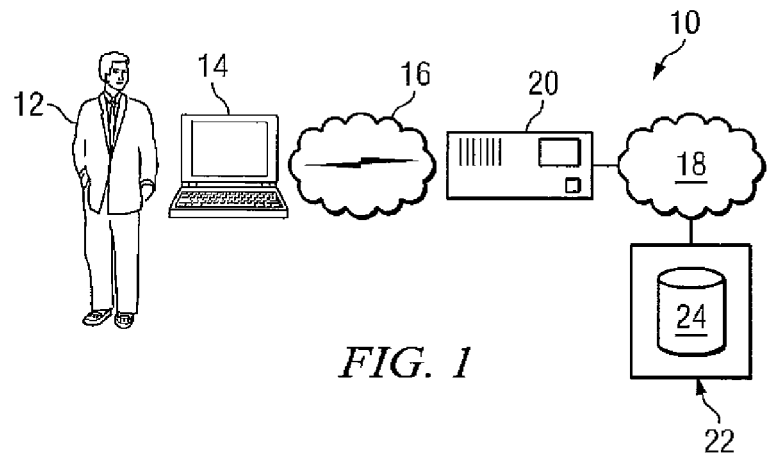
FIG. 1 is a diagrammatic representation of a system for providing bandwidth allocation according to one embodiment of the present invention.

FIG. 1 is a diagrammatic representation of a system 10 for providing bandwidth allocation according to one embodiment of the present invention. In system 10, a user 12, using a user device 14 on network 16, can send a network communication that is destined for a device on a controlled network 18. It should be noted that a user can be a human user, a programmatic user, or other user. User device 14 can comprise a desktop, a laptop, a PDA, a cell phone, a desktop computer or any other computing device capable of network communications. Network 16 and network 18 can be any networks known in the art including, but not limited to, LANs, WANs, the Internet, global communications networks, wireless networks and/or any other communications networks known in the art. For the sake of example, network 16 can be a wireless network and controlled network 18 can be the Internet. An access control device 20 ("control device 20") can control access to network 18 by users of network 16.

According to one embodiment of the present invention, when user 12 connects to control device 20 (e.g., by sending a network communication destined for network 18 from user device 14), control device 20 can retrieve a user profile for user 12 that governs the bandwidth allocations to user 12. In one embodiment of the present invention, control device 20 can receive the user profile for user 12 from an authentication database 24 at an authentication system 22 based on a set of user credentials provided by user 12 (e.g., password, user id, biometric data, certificates and or other user provided or hardware credentials known in the art). In another embodiment of the present invention, the user profile for user 12 can be stored at control device 10 in, for example, a local authentication database. Example authentication technologies include LDAP, Remote Authentication Dialup Internet User Specification ("RADIUS"), Microsoft Active Directory Service, Tivoli Access Manager, and Cisco TACACS/TACACS+. Authentication can occur as described in U.S. patent application Ser. No. 10/683,317, entitled "System and Method for Providing Access Control," filed Oct. 10, 2003, to Mackinnon et al., which is hereby fully incorporated by reference herein (the "Access Control Application").

Based on the user profile, control device 20 can establish a traffic control rule specifying maximum upload and download bandwidths for user 12. When network communications are received from user 12, control device 20 can determine if the maximum upload bandwidth has been exceeded and, if so, drop or queue the communication. When communications to user 12 are received from controlled network 18, control device 20 can determine if the maximum download bandwidth has been exceeded and, if so, drop or queue the communication. If the bandwidth allocations are not exceeded, control device 20 can pass the communication to/from user 12.

Figure 2:
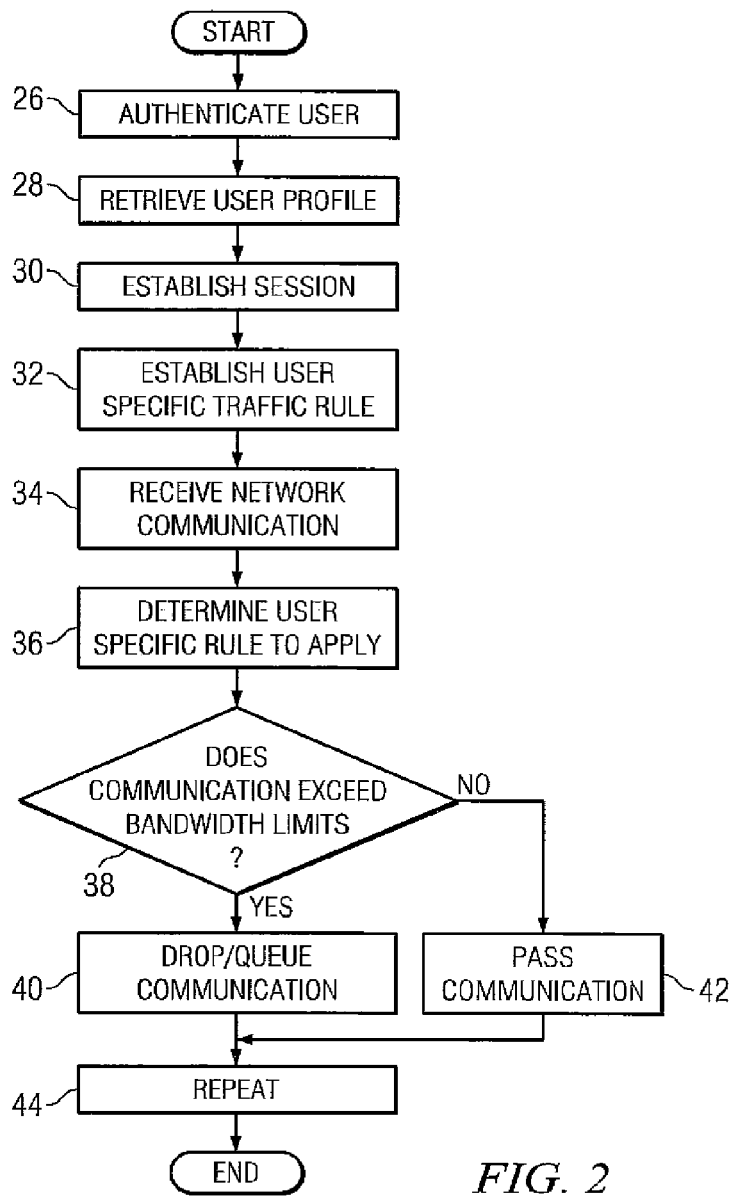
FIG. 2 is a flow chart illustrating one embodiment of a method for providing per user bandwidth allocation.

FIG. 2 is a flow chart illustrating one embodiment of a method for providing per user bandwidth allocation. In one embodiment of the present invention, a control device (e.g., control device 20 of FIG. 1) can authenticate a user (step 26) based on a network communication from a network application such as a web browser, ftp client, telnet client, mail user agent or other publicly available or proprietary network application running on a user device (e.g., laptop 14). Authentication can occur in any manner known in the art and, in one embodiment, can be carried out by the control device as described in the Access Control Application.

At step 28, the control device can retrieve a user profile. The user profile can be retrieved from remote storage (e.g., a remote authentication system) or from local storage (e.g., a local authentication database). The user profile can contain attributes that govern bandwidth allocation to an associated user. For example, the user profile can contain indicators of the upload and download bandwidth to which the user is entitled. The user profile can be received in a canonical format as an HTTP Post from the authentication system to the control device or in any manner known in the art.

According to one embodiment of the present invention, each user profile can have a predefined set of attributes. In some cases, the retrieved profile may not provide values for each of these attributes. Therefore, the control device can determine if the received user profile is complete, and, if it is not complete, can fill in the missing attribute values with default values, which can be part of the control device's local configuration or may be retrieved from remote storage by the control device during, for example, its initialization or startup phase.

At step 30, the control device can initiate a control session for the authenticated user. The control session can have a specified time limit, a time out limit and/or other session features known in the art. While the control session is active, the control device can govern a user's access to a network according to the user profile associated with that user and defaults and monitor the control session for characteristics such as bandwidth used or network session characteristics known in the art. The control session can be tracked by credentials, IP address, MAC address and/or other identifier.

At step 32, the control device can establish user specific rules and conditions based on attributes in the user profile. According to one embodiment of the present invention, the control device can map the attributes to a traffic control rule. By way of example, but not limitation, a user profile can contain attributes to specify upload and download bandwidth allocations for a user that can be mapped to a traffic control rule usable by a traffic conditioning module, such as the Linux based Traffic Control application, to regulate bandwidth usage by the corresponding user.

In one embodiment of the present invention, rules can be represented in an IP table. As would be understood by those of ordinary skill in the art, IP tables are essentially tables of rules that can be accessed by applications, such as a firewall or other application configured to access the IP tables. Rules in the IP table can be associated to a user through any arbitrary identifier. Using the example of FIG. 1, the IP table rule(s) for user 12 can be bound to user 12 based on the MAC address and IP address of user device 14 and the credentials provided by user 12 for the particular control session. If, for example, laptop 14 is associated with the MAC address 08:00:69:02:01:FF and the IP address 100.100.100, the user specific rules for user 12 can be indexed under these addresses and, for example, a user name for the control session.

An IP table rule can reference other rules or parameters for providing user specific provisioning. As an example, the IP table rule for user 12 can reference a traffic control rule that dictates that the bandwidth allocated to user 12 is 128 Kbps for uploads and 512 Kbps for downloads. A traffic control application, such as the Linux based Traffic Control application, can access the traffic control rule through the IP table and enforce the bandwidth allocation.

It should be noted that a user specific rule in an IP table can reference rules or parameters usable by any number of applications or processes, such as firewalls, traffic conditioning modules, virus scan applications or other applications known in the art. For example, a user specific rule can contain or reference parameters usable by a virus scan application to provide user specific virus scanning. It should be further noted that the use of IP tables to index user specific rules for provisioning of bandwidth is provided by way of example only, and user specific rules can be implemented in any suitable manner, as would be understood by those of ordinary skill in the art.

The control device, at step 34, can receive a network communication to/from a particular user. The network communication can include, by way of example, but not limitation, an HTTP message, an email message, a telnet message, an FTP message, UDP message or other network communication known in the art. As would be understood by those of ordinary skill in the art, many network communications (e.g., HTTP requests/responses, email messages, instant chat messages and other network communication known in the art) are carried by one or more IP packets. Each IP packet includes a header with originating IP address, destination IP address, originating MAC address, destination MAC address and/or other addressing information.

At step 36, the control device can determine which user specific rule(s) to apply to the network communication. This can be done, for example, by extracting information from IP packets associated with the network communication. For a network communication from a particular user, the control device can compare the originating IP address and/or MAC address to the IP addresses and/or MAC addresses used to index user specific rules in the IP table. For a network communication to a user, the control device can compare the destination IP address and/or MAC address to the IP addresses and/or MAC addresses used to index user specific rules in the IP table. Based on this information, the control device can access the appropriate user specific traffic control rule(s).

In one embodiment of the present invention, a traffic control rule can specify user specific upload and download bandwidths. The control device can apply the traffic control rule(s) for a user to regulate bandwidth usage by the user. Thus, the control device, at step 38 can determine if a network communication causes the maximum upload bandwidth limit for an originating user or the maximum download bandwidth for a destination user to be exceeded. If appropriate bandwidth limit is exceeded, the control device can queue or drop the network communication (step 40). If, on the other hand, the bandwidth limit is not exceeded, the control device can transmit the network communication to its destination (step 42). This process can be repeated (step 44) for each network communication.

Figure 3:
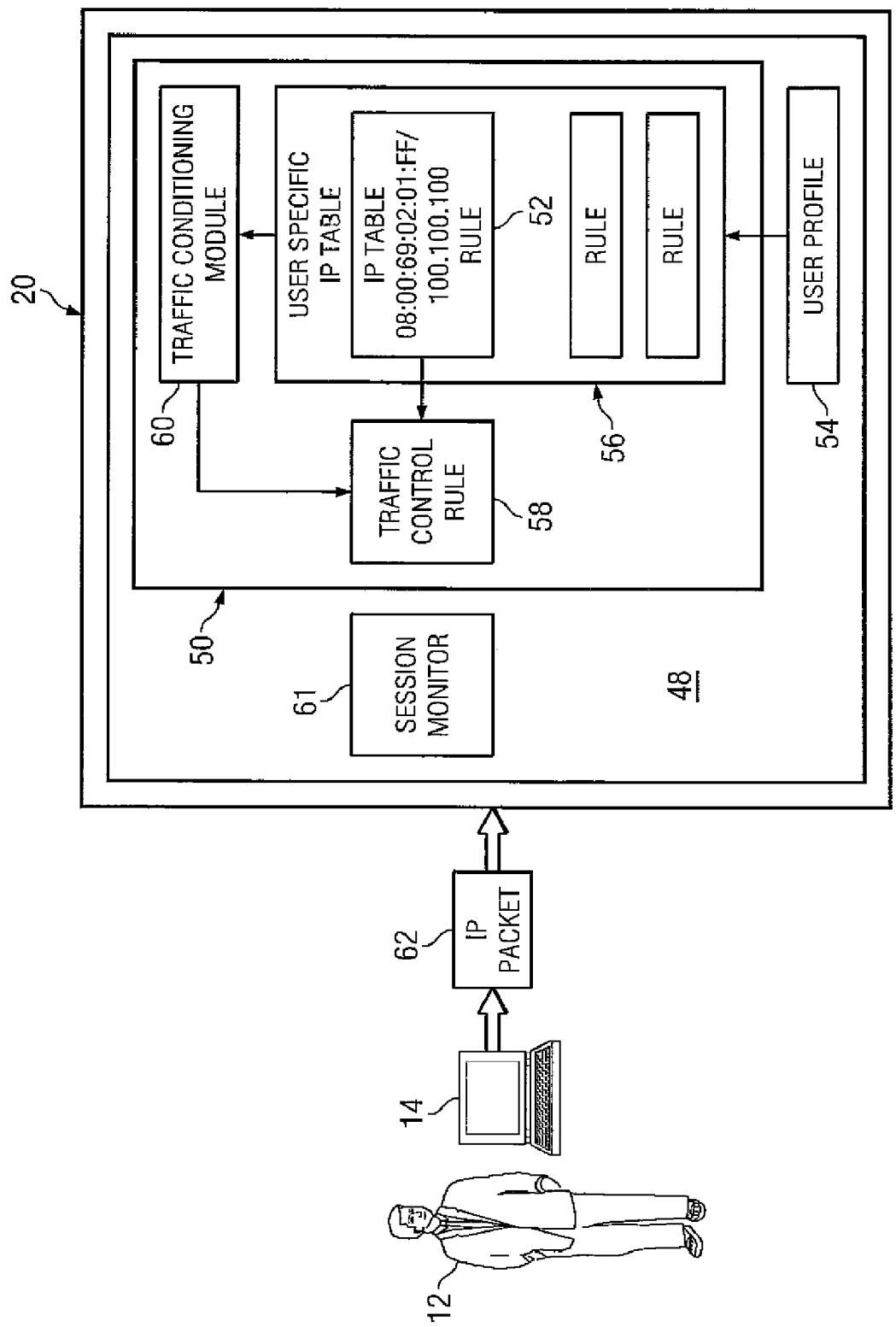
FIG. 3 is a diagrammatic representation of one embodiment of a software system for providing per user bandwidth allocation.

FIG. 3 is a diagrammatic representation of one embodiment of a software system for providing per user bandwidth allocation. According to one embodiment of the present invention, a set of computer instructions 48 running at control device 20 can include a provisioning module 50 to provision or allocate bandwidth to users. Provisioning module 50, according to one embodiment of the present invention can establish rules associated with a particular user based on a user's profile. For example, provisioning module 50 can establish user specific rule 52 for user 12 based on user profile 54. The user specific rules, in one embodiment of the present invention can be indexed through an IP table 56. Each user specific rule can be associated with a user based on an arbitrary identifier. For example, IP table 56 can contain user specific rule 52 for user 12 indexed to MAC address 08:00:69:02:01:FF and the IP address 100.100.100 of user device 14.

Each user specific rule in IP table 56 can optionally point to additional rules and parameters. For example user specific rule 52 can point to traffic control rule 58, which can also be based on user profile 54, to govern bandwidth provisioning to user 12. For example, user profile 54, in one embodiment of the present invention, can specify that user 12 is entitled to 128 Kbps for uploads and 512 Kbps for downloads. Provisioning module 50 map these attributes to a traffic control rule that contains these limitations and is usable by traffic conditioning module 60 to regulate bandwidth usage. One example of a traffic conditioning module that can be configured to access traffic control rules through an IP table is the Linux based Traffic Control application, however, any known or proprietary traffic conditioning set of computer instructions can be used by various embodiments of the present invention to apply per user traffic control rules.

In operation, provisioning module 50 can receive an IP packet 62 from user device 14. In one embodiment of the present invention, traffic conditioning module 60 can extract the originating IP address and/or MAC address from IP packet 62, access IP table 56 and locate user specific rule 54 on the originating MAC address and IP address. From user specific rule 52, traffic conditioning module 60 can locate traffic control rule 58 that specifies a maximum upload bandwidth of 128 Kbps. If packet 62 causes this limit to be exceeded, traffic conditioning module 60 can queue or drop packet 62. Otherwise, traffic conditioning module 60 can communicate packet 62 to its destination. Packet flow in the reverse direction can be processed in an analogous manner. For example, a packet arriving from the Internet destined for a user device 14 can be examined for destination IP address and MAC address. Based on these identifiers, traffic conditioning module 60 can access and apply traffic control rule 58 to limit the download bandwidth to 512 Kbps.

In the above example, user profile 54 contained attributes to govern the upload and download bandwidth allocations to user 12 regardless of the network application generating or receiving the IP packets. In another embodiment of the present invention, user profile 54 can prioritize network applications. As an example, user profile 54 can specify that IP packets associated with a game have priority over email messages, which have priority of HTTP messages. The priorities can be mapped to user specific traffic control rule 58. Continuing with the previous example, for the network application that is assigned a highest priority, traffic control rule 58 can specify that that network application is entitled to 320 Kbps for downloads and 80 Kbps for uploads, the network application assigned the next highest priority is entitled to 120 Kbps for downloads and 32 Kbps for uploads, and the network application assigned the lowest priority is entitled to maximum download and upload bandwidths of 64 Kbps and 16 Kbps, respectively. Traffic conditioning module 60 can read each IP packet to determine the network application with which it is associated, using any application detection scheme known in the art, and apply the application specific bandwidth limitations for user 12 in traffic control rule 58.

In another embodiment of the present invention, if user 12 exceeds the user specific bandwidth limits (e.g., 128 Kbps for uploads or 512 Kbps for downloads), traffic conditioning module 60 can simply drop packets associated with lower priority network applications until the upload or download bandwidth usage falls within the specified limit rather than assigning specific bandwidth limits to each application or class of applications. The present invention can also employ any other prioritization scheme as would be understood by those of ordinary skill in the art.

In addition to provisioning bandwidth to users on a per user basis, the control device can provide session monitoring at, for example, monitoring module 61. Monitoring module 61 can perform any session monitoring functions known in the art, including, but not limited, tracking session time, tracking timeouts, generating reports and metering bandwidth usage on a per session basis. One example of a monitoring module can be a Radius client. It should be noted that because bandwidth allocation occurs on a per user basis bandwidth metering can also occur on a per user basis. Any bandwidth metering scheme known in the art can be used.

Figure 4:
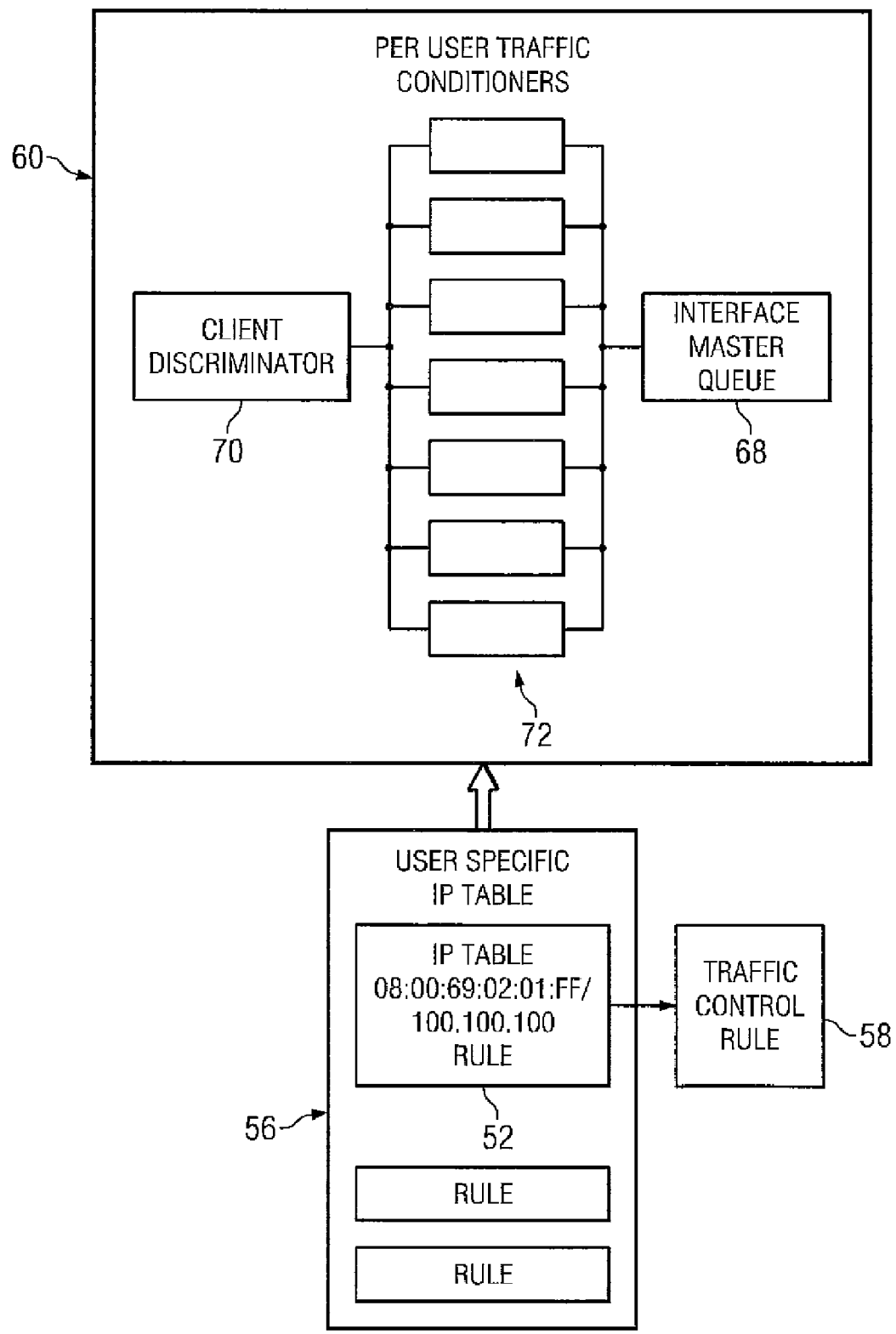
FIG. 4 is a diagrammatic representation of traffic conditioning module, according to one embodiment of the present invention.

FIG. 4 is a diagrammatic representation of traffic conditioning module 60, according to one embodiment of the present invention. Conditioning module 60 can include interface master queue 68, user discriminator 70 and user specific conditioners 72. User discriminator 70 can read a packet header to determine the appropriate user specific conditioner that will process the packet based on, for example, the IP address and MAC address of the packet. The user conditioner 72 can access the appropriate traffic control rule from IP table 56 to enforce user specific traffic conditions (i.e., upload and download bandwidth limits).

According to one embodiment of the present invention, conditioning module 60 can locate the user specific traffic control rule based on user specific IP table 56. For example, for a packet having the originating MAC address 08:00:69:02:01:FF and the IP address 100.100.100, traffic conditioning module 60 can access user specific rule 52 and, from user specific rule 52, user specific traffic control rule 58. The user specific traffic control rule can be enforced at the corresponding user specific conditioner.

For a particular network interface, each user can have an inward (i.e., download) and outward (i.e., upload) bandwidth allowance, based on attributes in the user's user profile. A bandwidth limit is the maximum rate at which a user is permitted to transmit or receive network traffic over a particular interface. User specific traffic conditioners 72 ensure that, if a user exceeds his or her bandwidth allowance for that interface, further network traffic for the user in that direction will be queued or dropped until the average data rate falls back within the bandwidth allowance. Thus, traffic conditioning module 60 can regulate bandwidth on a per user basis.

Interface master queue 68 can control the flow of network traffic over a particular interface (e.g., a particular Ethernet interface, wireless interface T1 interface, or other interface known in the art). It can be configured to send out data at whatever rate is appropriate for the corresponding network connection. Interface master queue 68 can be feed IP packets by user specific conditioners 72, each of which can have its own queue to hold packets the conditioner has accepted, but interface master queue 68 is not ready to accept.

Interface master queue 68, according to one embodiment o the present invention, can also reallocate bandwidth to particular users based on excess capacity, usage patterns, time of day, user priorities or other factors known in the art. As an example, when bandwidth is available due to low demand by other users, a particular user may achieve rates in excess of the limits specified in the user's user profile. Excess bandwidth can be divided "fairly" between subscribers. When demand exceeds the available bandwidth, the bandwidth allocated to a user can throttled to or below the amount of bandwidth designated by the user profile.

It should be noted that the architectures of FIG. 3, and FIG. 4 are provided by way of example only and bandwidth provisioning and monitoring can be implemented using any suitable programming language and/or structure known in the art. In the example of FIG. 3, provisioning module 50 provides traffic conditioning based on a set of IP tables. It should be noted, however, that the rules for traffic conditioning can be defined in any arbitrary manner usable by a traffic conditioning module. It should be further noted, that provisioning module 50 can provide additional services on a per user basis, such as virus scanning, worm detection, firewall services or any other service known in the art. Each of these additional services can access rules and parameters based, for example, on IP table(s). Moreover, the use of IP tables to index and provide access to rules and parameters for particular processes is also provided by way of example. In other embodiments of the present invention, a user profile can be mapped to rules and parameters for various applications in any suitable programming manner known in the art.

In the example of FIG. 3, traffic conditioning module 60 applied the bandwidth limitations in traffic control rule 58 as hard limits. That is, regardless of overall available bandwidth, traffic conditioning module 60 will limit the upload and download bandwidths to 128 Kbps and 512 Kbps limits specified in traffic control rule 58. In another embodiment of the present invention, the traffic conditioning module at, for example, interface master queue 68, can alter the bandwidth limits for a user dynamically to account for excess capacity, usage patterns, number of user, or any other factor.

Figure 5:
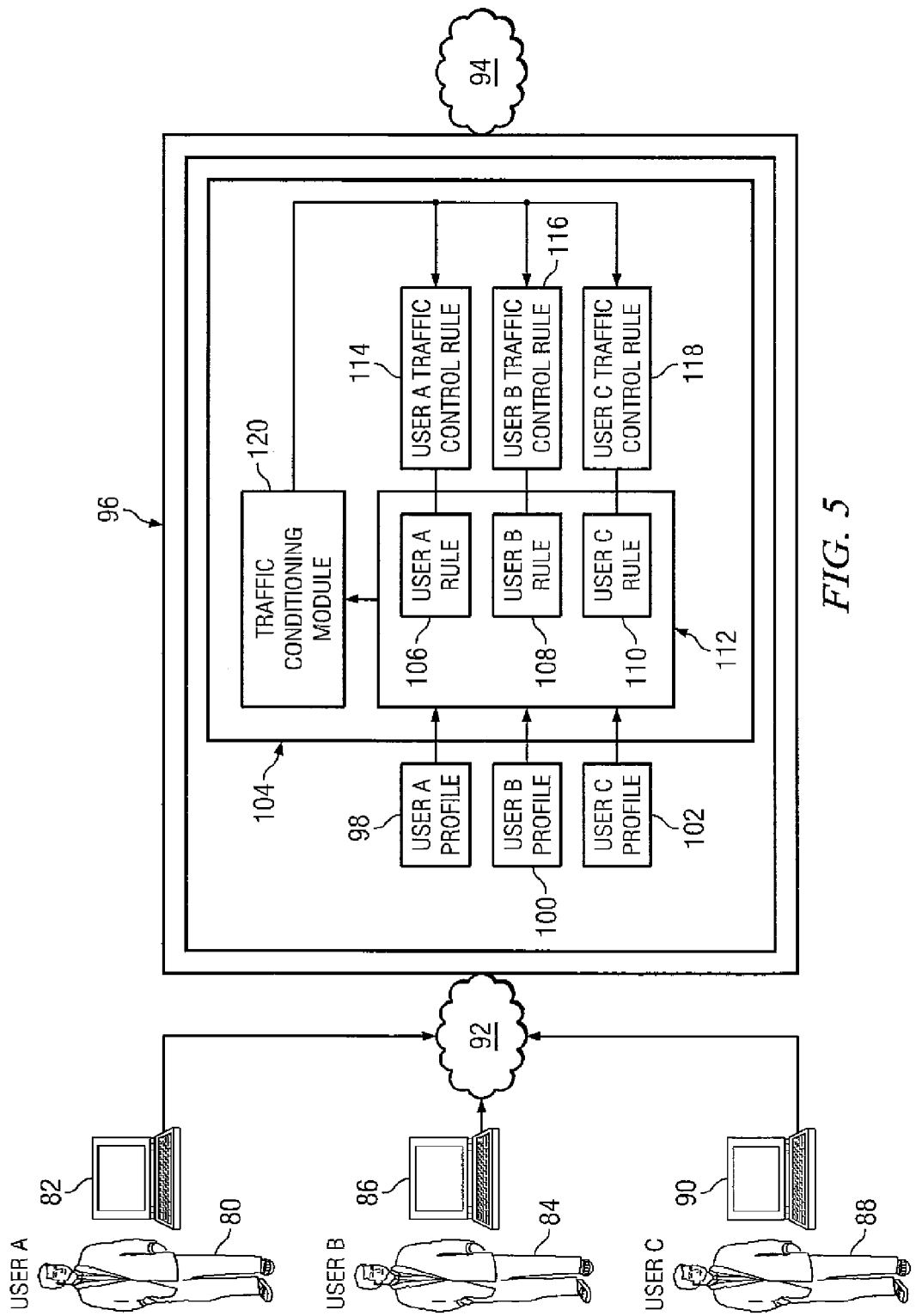
FIG. 5 is a diagrammatic representation of a system for dynamically allocating bandwidth to users on a per user basis, according to one embodiment of the present invention.

FIG. 5 is a diagrammatic representation of a system for dynamically allocating bandwidth to users on a per user basis, according to one embodiment of the present invention. In FIG. 5, user 80 (User A) using user device 82, user 84 (User B) using user device 86 and user 88 (User C) using user device 90 on network 92 can send a network communications destined for locations on a controlled network 94. Network 92 and network 94 can be any networks known in the art including, but not limited to, LANs, WANs, the Internet, global communications networks, wireless networks and/or any other communications networks known in the art. For the sake of example, network 92 can be a wireless network and controlled network 94 can be the Internet. A control device 96 can control access by users on network 92 to controlled network 94 and allocate bandwidths to the users on a per user basis.

In one embodiment of the present invention, control device 96 can retrieve a user profile for each user on network 92 (e.g., user profile 98 for User A, user profile 100 for user B and user profile 102 for User C). For each user profile, a provisioning module 104 at control device 96 can establish a user specific rule (user specific rule 106 for User A, user specific rule 108 for User B and user specific rule 110 for User C) indexed, for example, in IP table 112. Additionally, based on the user profiles, provisioning module 104 can establish traffic control rules for each user (e.g., traffic control rule 114 for User A, traffic control rule 116 for User B and traffic control rule 118 for User C) which can be referenced by the respective user specific rule in IP table 112. Each traffic control rule can be based on the user profile and can specify bandwidth allocations for the corresponding user. It should be noted that the use of one or more IP tables to index traffic control rules through user specific rules is provided by way of example only, and the present invention can specify bandwidth allocations on a per user basis in any suitable manner.

In operation, traffic conditioning module 120 can receive packets to/from User A, User B and/or User C and process the packets according to the corresponding traffic control rules. For example, traffic conditioning module 118 can receive a packet from User A, access user specific rule 106 in IP table 112 based, for example, on a MAC address and IP address for user device 82, access traffic control rule 114 referenced by user specific rule 106, and apply traffic control rule 114 to drop the packet, queue the packet or communicate the packet to network 94 based on whether or not the packet causes bandwidth limits in traffic control rule 114 to be exceeded.

Each user profile, in one embodiment of the present invention, can specify that a corresponding user is entitled to a particular bandwidth. Provisioning module 104 can establish traffic control rules that contain these limitations. However, the traffic control rules if simply based on the user profiles may not account for a variety of network conditions, such as, for example excess capacity, new users, usage conditions and other such factors.

As an example, assume control device 96 has 1000 Kbps available as its overall download bandwidth capacity, user A is allocated a maximum of 500 kbps download bandwidth based on user profile 98, user B is allocated a maximum of 250 kbps download bandwidth based on user profile 100 and only User A and User B are using network 92 to access controlled network 94 (i.e., User C is not connected to network 92). In this case, based on the user profiles, traffic control rule 114 and traffic control rule 116 will specify maximum download bandwidths of 500 Kbps and 250 kbps respectively. If traffic conditioning module 120 applies traffic control rule 114 and traffic control 116 with download bandwidth limits of 500 kbps and 250 kbps, control device 96 will have an excess capacity of 250 kbps for downloads.

In one embodiment of the present invention, traffic conditioning module 120, at for example the interface master queue corresponding to network 94, can reassign the bandwidth limits to User A and User B to account for the excess bandwidth. For example, traffic conditioning module 120 can evenly divide the excess capacity to provide User A and User B with an additional 125 Kbps each for downloads. According to one embodiment, traffic conditioning module 120 can establish the new download bandwidth limits of 625 Kbps and 375 Kbps for User A and User B by modifying traffic control rule 114 and traffic control rule 116, respectively. Because, in this embodiment of the present invention, the traffic control rule is referenced for each user by the IP table, but is not part of the IP table, the new bandwidth limits for User A and User B can be implemented without modifying IP table 112.

As a further example, assume that based on their user profiles, User A is allocated 500 Kbps for downloads and User B has been allocated 250 Kbps for downloads, leaving an excess capacity of 250 Kbps. Assume that User C connects to network 92 to gain access to controlled network 94. Control device 96 can retrieve user profile 102 and, based on user profile 102, establish user specific rule 110 and traffic control rule 118 for User C. If user profile 102 specifies that User C is entitled to 500 Kbps for downloads, the overall provisioned bandwidth will exceed the available bandwidth at control device 96 (i.e., the overall provisioned bandwidth will be 1250 Kbps in comparison to the available 1000 Kbps). Therefore, traffic conditioning module 120 can reallocate bandwidth among the users by modifying the traffic control rules for each user.

In one embodiment of the present invention, where there is insufficient capacity to serve all users fully, the users must essentially "compete" for what is available. If the total available bandwidth is less than the sum of all nominal allowances (e.g., the total available bandwidth of 1000 Kbps is less than the allocated bandwidth of 1250 Kbps), then the effective bandwidth offered to each user can governed by the following:

$$W = \Sigma w_i \quad \text{[EQ.1]}$$

$$e_i = a_i w_i / W \quad \text{[EQ. 2]}$$

where: $w_i$ is the weight applied to bandwidth allowance i for a user using an interface (e.g., the interface to network 94); W is the sum of all weights on all bandwidth allowances on this interface; $e_i$ is the effective bandwidth for allowance i; and $a_i$ is the nominal bandwidth for allowance i. In the above example, User A's nominal bandwidth ($a_i$) allowance for using controlled network 94 is 500 Kbps. The weight $w_i$ for each user for a given interface can be calculated based on, for example, a service factor specified in each user's user profile. If all user profiles specify the same service factor, then all users will have their bandwidth limits reduced by the same amount to bring the allocated bandwidth within the bandwidth capacity of the control device. If a user profile specifies a smaller service factor, then that user will lose a correspondingly less amount of bandwidth. If a user profile specifies that a user's bandwidth is incompressible, this means that, even if there is insufficient available bandwidth to serve all other users fully, this user's bandwidth allowance will not be reduced. This will result in more severe effective reductions for other users whose bandwidth allowances are not marked as incompressible.

In the above example, if each user profiles for User A, User B and User C specify the same service factor, traffic conditioning module 120 can reduce the maximum download bandwidth limit for each of User A, User B and User C by 83.3 Kbps (i.e., the total excess allocation of 250 Kbps divided evenly among the users). To effect this change, traffic conditioning module 120 can modify traffic control rule 114 to include a download bandwidth limit of 416.7 Kbps, traffic control rule 116 to include a download bandwidth limit of 166.6 Kbps, and traffic control rule 118 to include a download bandwidth limit of 416.7 Kbps, for a total bandwidth allocation of 1000 Kbps among User A, User B and User C. Thus, a control device can dynamically change the allocations of bandwidth on a per user basis to account for new users.

In the above examples, traffic conditioning module 120 dynamically calculated bandwidth allocations for Users A, B and C. In another embodiment of the present invention, control device 96 can receive a new user profile for a particular user and update the traffic control rule for that user to reflect changes in the user profile. As an example, if control device 96 controls access to network 94 based on paid subscriptions by users, the initial user profile 98 for User A can specify upload and download bandwidth limits, say 250 Kbps for uploads and 500 Kbps for downloads. If User A then pays for more bandwidth during a session, user profile 98 can be updated by control device 96 or by another system (e.g., a backend system). The new user profile can now specify, for example, that User A is now entitled to 750 Kbps for downloads. Control device 96 can update traffic control rule 114 to reflect the change in maximum bandwidth for User A without requiring User A to reauthenticate to get the new bandwidth limits.

In yet another embodiment of the present invention, control device 96 can dynamically change per user bandwidth allocations if a higher priority user or user device is sending/receiving network communications. Assume, for example, User C is considered to have a higher priority than User A or User B. When User C connects to control device 96 with user device 94, User C can be allocated the full 500 Kbps for downloads specified in user profile 102. The download bandwidth allocations for User A and User B can be reduced to bring the total download allocation among all users to the 1000 Kbps capacity of user device 96. It should be noted that although the above examples discussed dynamic allocation of bandwidth in terms of downloads, upload bandwidth allocations can be similarly modified.

The program architecture of FIG. 5 is provided by way of example only and dynamic bandwidth allocation on a per user basis can be implemented in any suitable programming manner known in the art. Additionally, control device 96 can dynamically change the bandwidth allocations to users according to any bandwidth shaping scheme known in the art. For example, control device 96 can adjust the bandwidth limits for users based on time of day, usage patterns or utilization averaging.

Dynamic bandwidth shaping based on time of day can allow control device 96 to provide particular users with additional bandwidth during peak hours. Allocating bandwidth based on usage patterns can allow a control device to set higher bandwidth limits for a user for a short period of time to account for, for example, bursty traffic. For short interactive traffic or short file transfers, this can give the user a high available bandwidth. If the user continues to use a high amount of bandwidth, the user's bandwidth limits can be lowered so that user does not use too much of the control device's bandwidth capacity for too long. Utilization averaging allows for better fairness in allocation of excess bandwidth based upon measured utilization rates of competing users over a period of time. If the control device affords a users a higher bandwidth than specified in the user's user profile, the control device can dynamically lower the bandwidth allocation for that user to a level lower than specified in the user's user profile to allow other users additional bandwidth.

In summary, control device 96 can retrieve a set of user profiles (e.g., user profile 98, user profile 100 and user profile 102) for a set of users (User A, User B and User C) and establish upload and/or download bandwidth limits for each user based on the corresponding user profile for that user (e.g., user profile 98 for user A, user profile 100, for User B and user profile 102 for User C). The control device can regulate bandwidth usage for each user based on the bandwidth limit(s) established for that user. Additionally, the control device, according to one embodiment of the present invention, can update the bandwidth limit(s) for one or more of the users based on new users connecting to control device 96, excess capacity, utilization averaging, time of day or other factors known in the art.

Figure 6A:
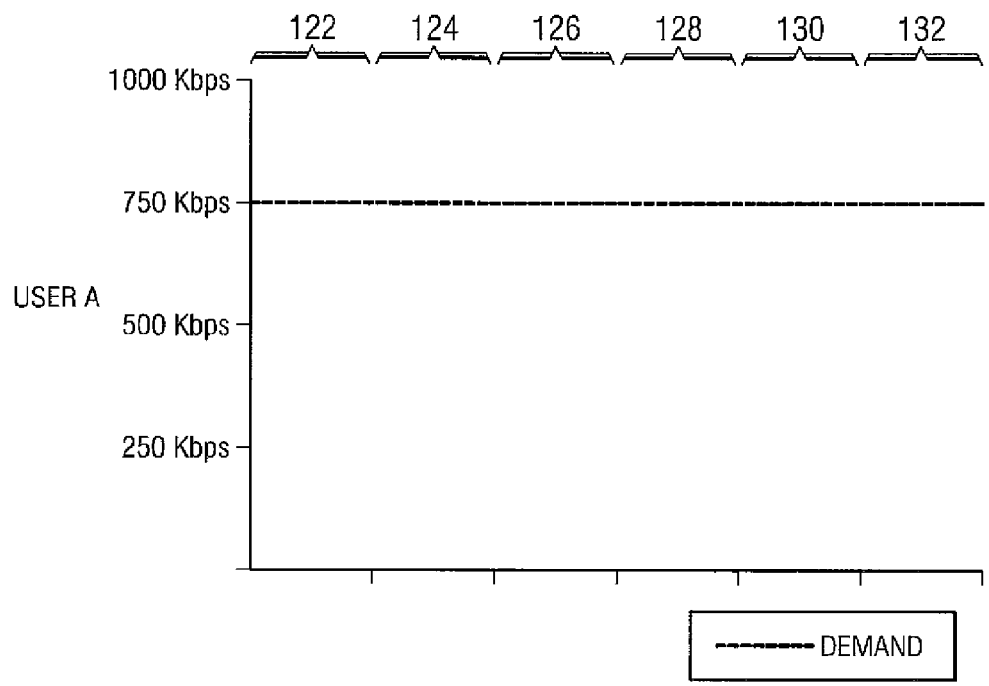
FIGS. 6A-6D illustrate various embodiments of bandwidth shaping.
Figure 6A:
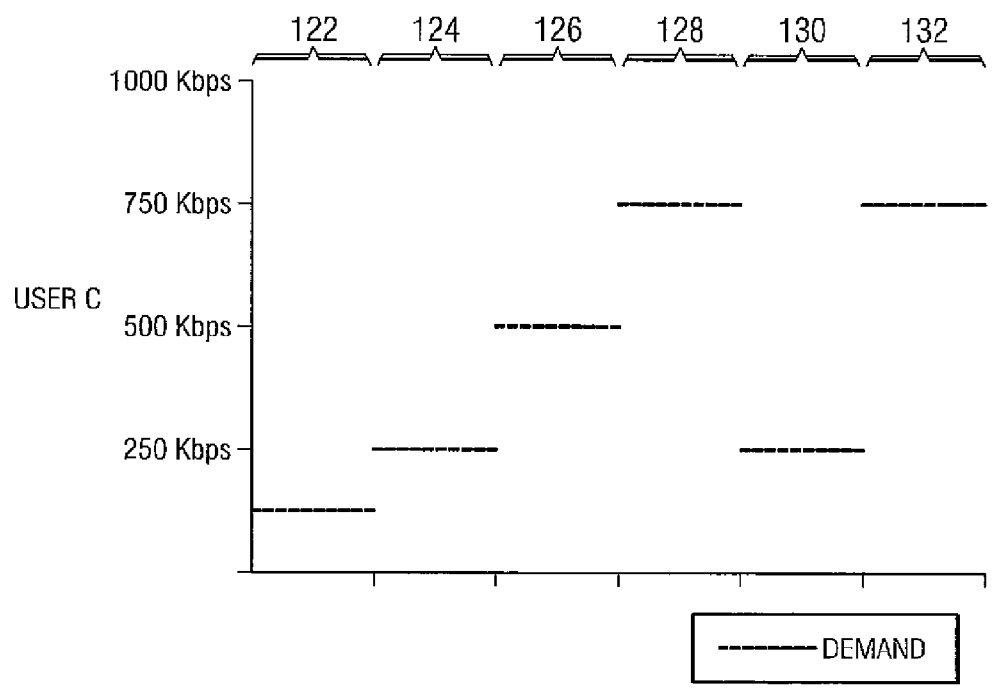

FIGS. 6A-6D illustrate various embodiments of bandwidth shaping, using the example of User A and User C from FIG. 5. In this case, it is assumed, for the sake of example, that User B is not connected to the control device. FIG. 6A illustrates example bandwidth demands for User A and User C respectively. User A has a constant bandwidth demand (e.g., a file transfer), whereas User C has bursty traffic (e.g., web traffic). Both user's are initially allocated the same amount of bandwidth based on their respective user profiles (i.e., 500 Kbps). The dashed lines represents User A's bandwidth demand and User C's bandwidth demand for six time periods (period 122, period 124, period 126, period 128, period 130 and period 132). The control device, by way of example, but not limitation, has a maximum capacity of 1000 Kbps.

Figure 6B:
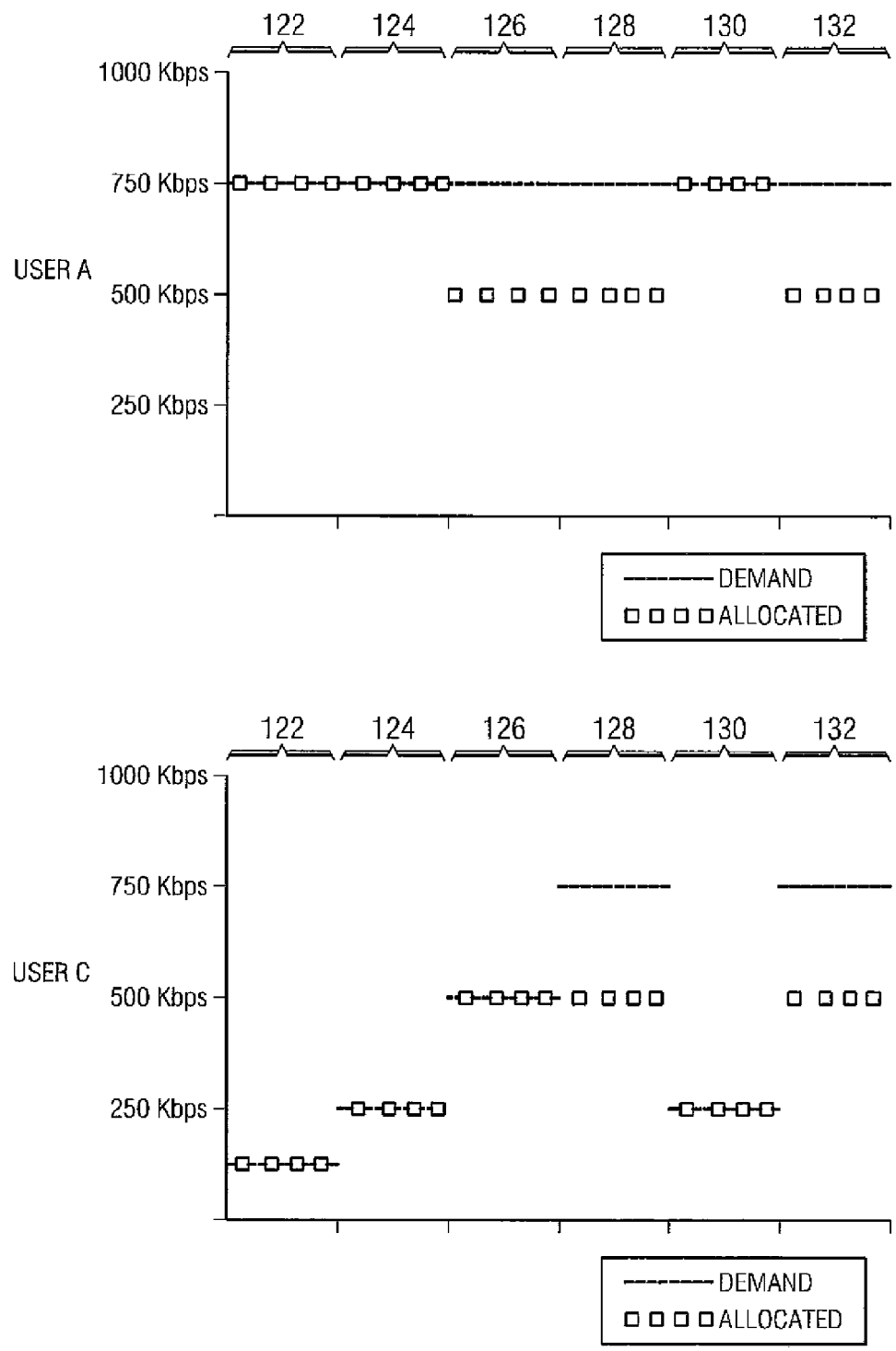

FIG. 6B illustrates one embodiment of dynamically allocating bandwidth between User A and User C. The dashed lines represent the bandwidth demands from FIG. 6A and the squared lines represent the bandwidth allocated to each user in a given time period. During all time periods User A is demanding more than the •Kbps specified in the User A's user profile. User C however, can be demanding more or less bandwidth in a given period. For example, in period 122, User C is demanding less bandwidth. Therefore, a control device can update the traffic control rules for User A and User C to allocate more bandwidth to User A and less bandwidth to User C. During time period 126, both User A and User C are demanding at least 500 Kbps of bandwidth, making the total bandwidth demand greater than the available 1000 Kbps. The control device can again update the bandwidth allocations for User A and User C to limit User A and User C to the 500 Kbps specified in each user's profile. The control device can continue to allocate bandwidths to User A and User C as shown in FIG. 6B. In one embodiment of the present invention, this can be done by updating the traffic control rules for each user, as described in conjunction with FIG. 5.

Figure 6C:
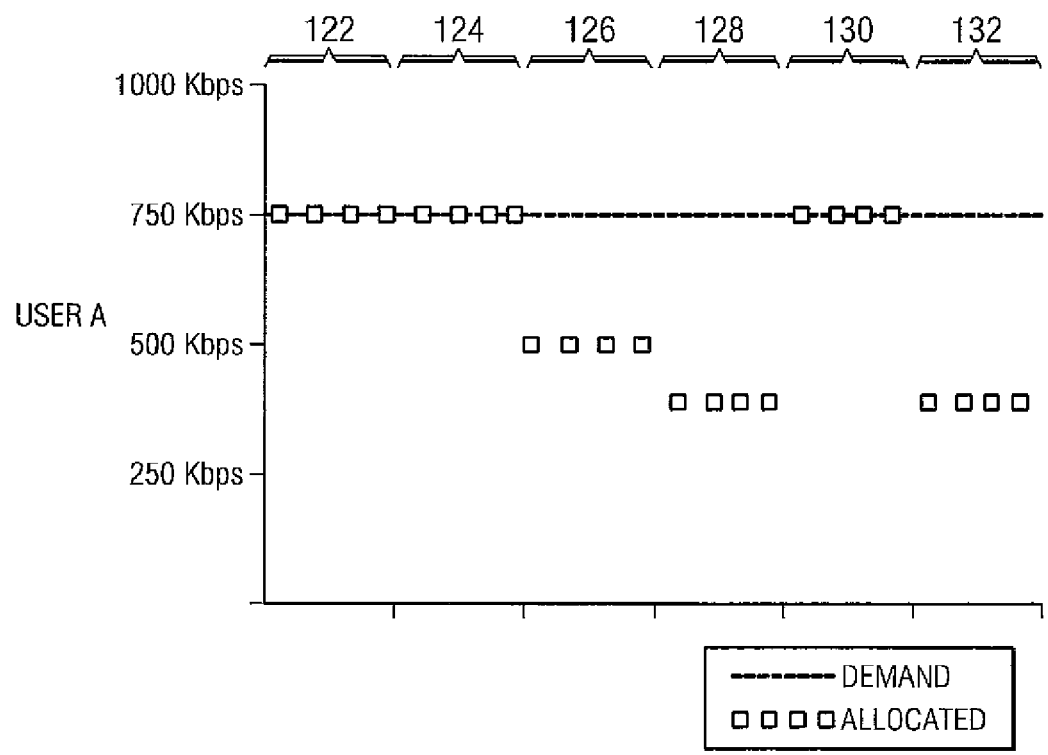
Figure 6C:
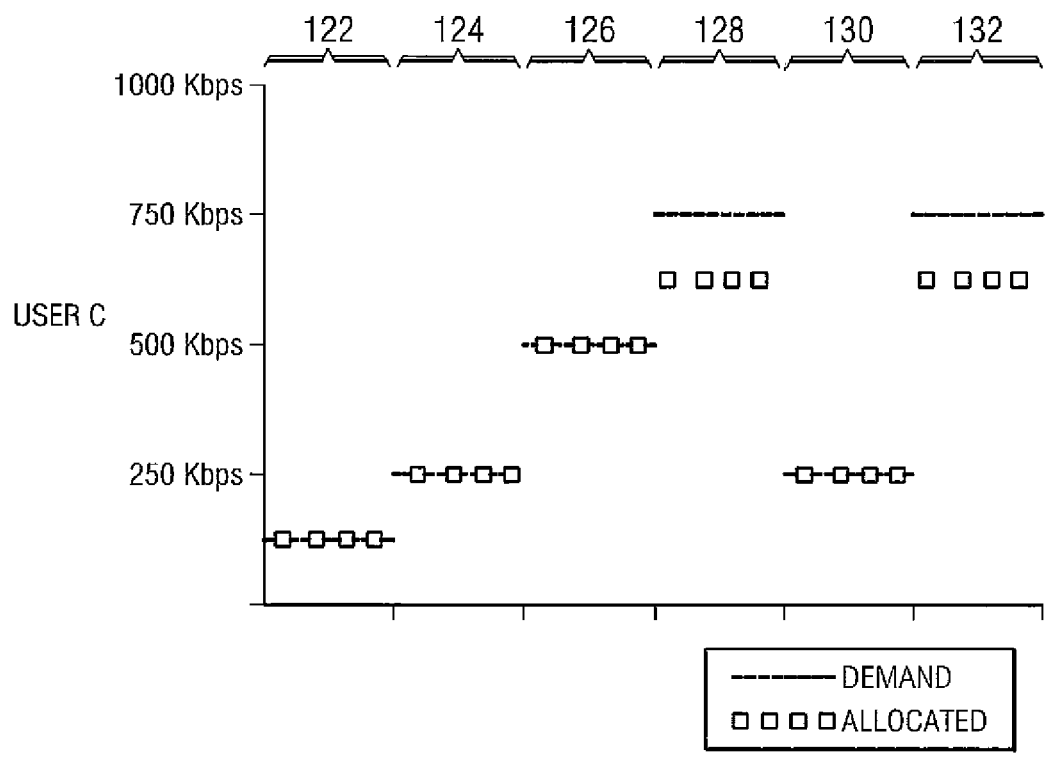
Figure 6D:
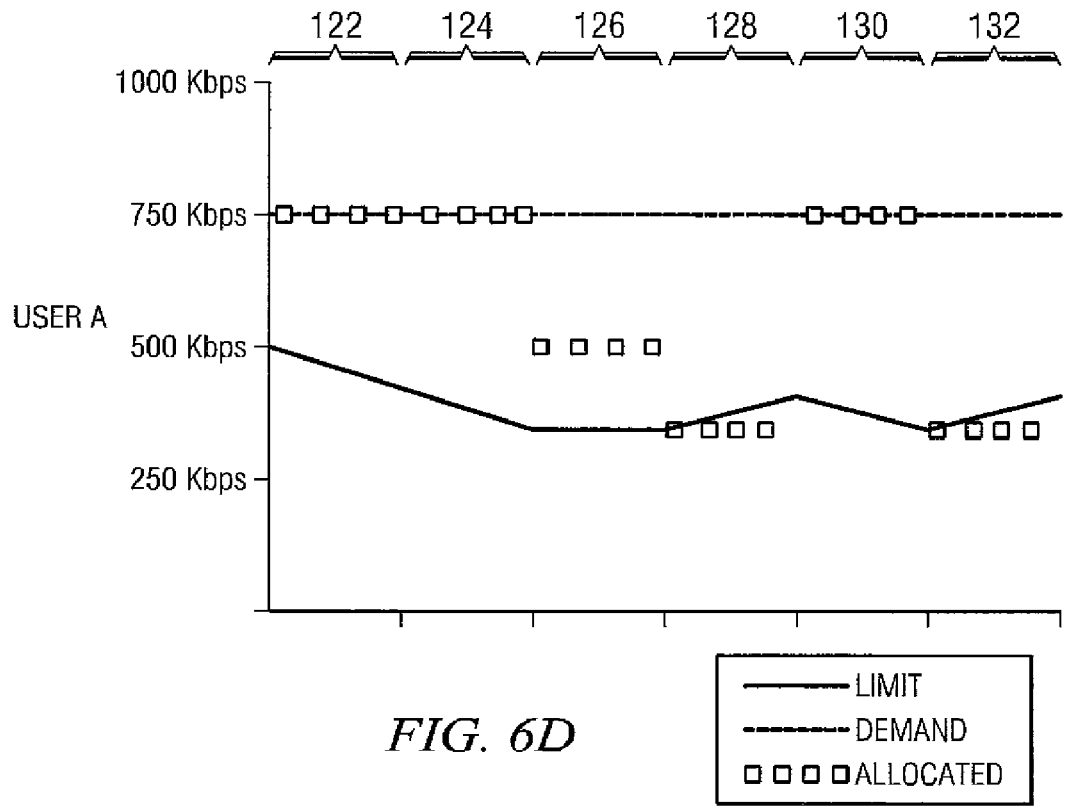

FIG. 6C illustrates another embodiment of bandwidth shaping using utilization averaging. As shown in FIG. 6C, there will be periods (e.g., time period 128 and period 130) in which User C is able to use more than •Kbps, even though User A is continuing to have high demand. The allocation of bandwidth for each user can be based on a dynamic limit calculated for that user based on the user's utilization of bandwidth. The dynamic limit can be enforced whenever User A and User C compete for capacity (i.e., whenever their joint demands exceed 1000 Kbps). In one embodiment of the present invention, the dynamic limit for each user can be inserted into the traffic control rule for that user, whenever the user's compete for capacity. FIG. 6D provides an example of the changing dynamic limit for User A, to produce the bandwidth allocation for User A shown in FIG. 6C.

FIG. 6D illustrates how a dynamic limit for User A can be changed in order to allow utilization averaging. In FIG. 6D, the dashed line represents User A's demand, the solid line represents the dynamic limit for User A and the blocked line the represents the bandwidth allocated to User A. The demand and bandwidth allocation are the same as in FIG. 6C for User A. The dynamic limit can be enforced for User A whenever User A and User C compete for bandwidth (i.e., when their demands exceed 1000 Kbps in this example). As shown in the example of FIG. 6D, User A is permitted to take advantage of surplus bandwidth in periods 122 and 124 because User A and User C are not competing for capacity (see FIG. 6C). The dynamic limit though not the bandwidth limit for User A is adjusted downward, based on the cumulative total of surplus bandwidth used.

At time period 126, the bandwidth allocation remains steady. During this time period, User C is only demanding 500 Kbps, so User A can be allocated the remaining 500 Kbps, even though the dynamic limit is below 500 Kbps. Both users can, therefore, be allocated 500 Kbps. When user C exceeds 500 Kbps (i.e., when User C competes for the excess bandwidth), the control device can enforce the dynamic limit for User A in time period 128. User A will see a throughput of less than 500 Kbps because the dynamic limit for User A is below 500 Kbps. During the time period in which User A is limited to less than 500 Kbps, the dynamic limit for User A can be slowly increased. The pattern follows another decrease and increase in periods 130 and 132.

In one embodiment of the present invention, whether a dynamic limit for a user is adjusted up or down can be based on whether a user uses more or less bandwidth than the bandwidth limit specified in that user's user profile. In another embodiment of the present invention, whether a dynamic limit for a user is adjusted up or down can be based on whether a user uses more or less bandwidth than his or her proportional share of the available capacity (e.g., more or less than 50% if there are two users). The dynamic limit can be enforced for a user by modifying the traffic control rule for that user to include the dynamic limit as a bandwidth limit for the user. The traffic control rule for each user can be updated on an arbitrary schedule to enforce the changing dynamic limits.

It should be noted that, according to one embodiment of the present invention, a user who sustains a long period of high demand should not be subject to an ever-decreasing allocation of bandwidth. This could result in severe attenuation of the user's bandwidth the moment other users have an increased demand. In one embodiment of the present invention, two approaches can be used separately or in combination to remedy this: a lower limit on the dynamic bandwidth, and a rolling window for cumulative measurement. A lower limit would establish that a user's bandwidth allocation never drop below some point, for instance half of the rate specified in the user's user profile. A rolling window defines a limited period of time, say ten minutes, for the cumulative measurement. This would mean that the user's bandwidth allocation calculated as though prior to the last ten minutes, no surplus bandwidth had been used, and the bandwidth allocation for the user had been set as specified in the user's user profile.

It should be noted that above examples of dynamic bandwidth allocation are provided by way of example only. A control device can dynamically calculate bandwidth allocations for users according to any bandwidth shaping scheme known in the art. Moreover, updated bandwidth limits can be provided to a traffic conditioning module in any suitable manner, as would be understood by those of ordinary skill in the art.

Figure 7:
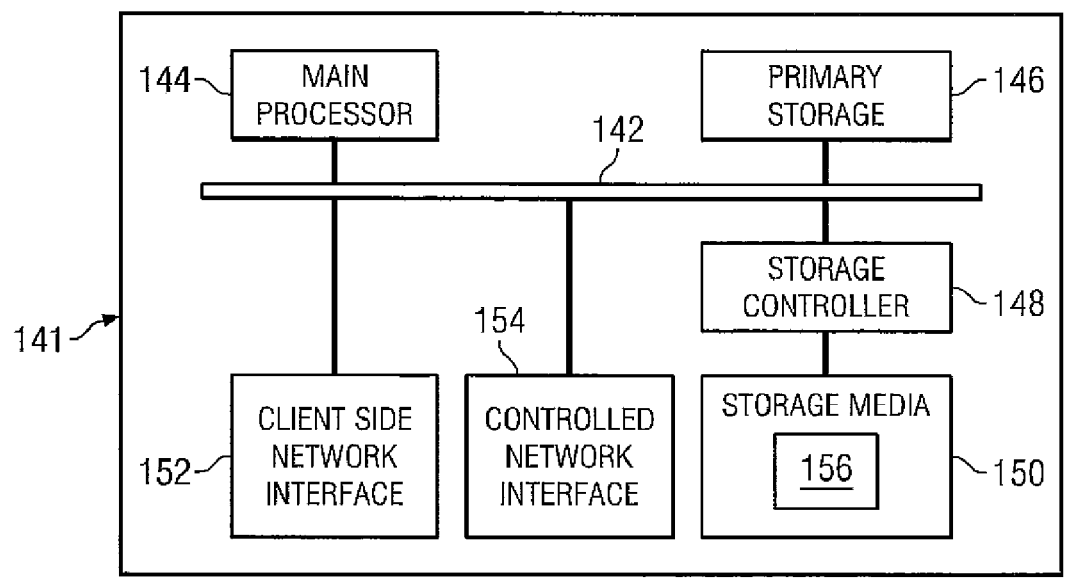
FIG. 7 is a diagrammatic representation of one embodiment of a control device that can provide user based provisioning of bandwidth.

FIG. 7 is a diagrammatic representation of one embodiment of a control device 141 that can provide user based provisioning of bandwidth. For the purposes of example, control device 141 can comprise a main bus 142, a main processor 144, a primary storage medium 146, a secondary storage controller 148, a storage medium 150, a user side network interface 152 and a controlled network network interface 154. The network interfaces can include Ethernet interfaces, fibre channel interfaces, T'interfaces, wireless interfaces or other network interfaces known in the art. Other devices may be connected to or be part of such a control device include, by way of example, but not limitation, controllers, a display, a mouse, a keyboard, and so forth. Additionally, control device 140 can include additional interfaces to communicate to additional networks using various protocols and can include interfaces for administrative functions.

The main processor 144 communicates with the other components by way of the main bus 142. This main processor 144 can be a general purpose processor, a limited processor such as an ASIC or microcontroller, or any other instruction execution machine. The primary storage 146 can provide transient memory or storage space for use by programs executing on the main processor 144. The main processor 144 communicates with the primary storage in any manner known in the art.

The secondary storage controller 148 connects a storage medium 150 such as a hard drive, CD-ROM, floppy, tape drive, optical storage medium, memory or other storage device to the main processor 144 by way of the main bus 142. The main processor 144 communicates with the secondary storage controller 148 by way of the main bus 142, and the secondary storage controller 148 is used to read and/or write the storage medium 150 on behalf of the main processor 144.

Control device 141 may communicate with other computing devices (e.g., user devices, network servers, etc.) by way of networks using network interfaces (e.g., user side network interface 152 and controlled network network interface 154 or other network interface). Computer instructions running on the main processor may then access other computers across the network in any of the conventional ways, e.g. by executing "protocols" which affect the transmission and reception of protocol data units, packages, etc. over the data transmission network.

In one embodiment of the present invention, storage medium 150 can store a set of computer instructions 156 that are executable by processor 144. During execution, portions of computer instructions 156 and data can be stored in primary storage 146, as would be understood by those of ordinary skill in the art. Processor 144 can execute computer instructions 156 to allocate bandwidths on a per user basis and enforce the bandwidth allocations.

Although shown as a standalone device in FIG. 7, control device 141 may be integrated with and share components with other devices such as routers, servers, hubs or other devices known in the art. Additionally, computer instructions 156 can be distributed across multiple storage media and can be executed by multiple processors. One example of an exemplary control device is the Rocksteady NSA Server, from Rocksteady Networks, Inc. of Austin, Tex.

Control device 141, as described in the Access Control Application, can also provide any arbitrary services known in the art, including, but not limited to, web server functions, DHCP client for negotiation with ISPs, DHCP server to assign IP addresses to user devices, kernel based packet filtering and stateful inspection, IP sharing, NATplus, port redirection, information and attack logging, automatic updating, VPN masquerade, remote support and configuration, name server configuration and/or web content filtering. User profiles can be used by the control device to govern provisioning of network access on a user specific basis. By way of example, but not limitation, a user profile can contain attributes to specify upload and download bandwidth allocations for a user, firewall settings, whether the user can use transient VPNs, whether the user can use streaming services or voice over IP services, whether the user should be permitted to perform video teleconferencing, whether the control device should perform virus scanning or worm detection for the user, whether the user can utilize print services, surcharges for services or other settings.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A device for dynamically allocating network bandwidth on a per user basis comprising:
    a processor;
    a first network interface coupled to the processor;
    a second network interface coupled to the processor;
    a hardware storage medium accessible by the processor;
    a set of computer instructions stored on the storage medium, executable by the processor to:
        retrieve a set of user profiles, wherein each user profile corresponds to a specific user in a set of users;
        establish at least one network bandwidth limit for each user in the set of users based on the corresponding user profile for that user;
        for each user in the set of users, regulate network bandwidth usage associated with that user based on the at least one network bandwidth limit established for that user;
        receive a network communication from a network application running on a first user device communicatively coupled to the first network interface, wherein the network communication is destined for a second device on a second network coupled to the second network interface;
        retrieve a first user profile for a first user associated with the first user device from an authentication database based on user credentials provided by the first user;
        initiate a control session for the first user;
        based on attributes in the first user profile, establish user specific rules and conditions that are bound to the first user during the control session based on the first user device and the user credentials provided by the first user for the control session; and
        dynamically update the at least one network bandwidth limit for at least one user from the set of users to account for the first user gaining access to the second network.

2. The device of claim 1, wherein the computer instructions are further executable to dynamically update the at least one network bandwidth limit for each user in the set of users.

3. The device of claim 1, wherein the computer instructions are further executable to dynamically update the at least one network bandwidth limit for each user in the set of users to account for a new user connecting to the device.

4. The device of claim 1, wherein the computer instructions are further executable to dynamically update the at least one network bandwidth limit for at least one user based on a time of day.

5. The device of claim 1, wherein the computer instructions are further executable to dynamically update the at least one network bandwidth limit based on utilization averaging for the corresponding user.

6. The device of claim 1, wherein the computer instructions are further executable to dynamically update the at least one network bandwidth limit by modifying a traffic control rule containing the at least one network bandwidth limit.

7. The device of claim 1, wherein the computer instructions are further executable to meter network bandwidth usage on a per user basis.

8. The device of claim 1, wherein the computer instructions are further executable to establish a traffic control rule for each user containing the at least one network bandwidth limit for that user.

9. The device of claim 8, wherein the computer instructions are further executable to dynamically update the at least one network bandwidth limit for the at least one user by updating the traffic control rule for the at least one user.

10. The device of claim 9, wherein the computer instructions are further executable to access each traffic control rule from an IP table based on an indicator associated with each traffic control rule.

11. The device of claim 10, wherein the indicator comprises a MAC address associated with the at least one user.

12. The device of claim 10, wherein the indicator comprises an IP address associated with the at least one user.

13. The device of claim 1, wherein the computer instructions are further executable to:
access a traffic control rule for the first user that includes an upload network bandwidth limit for the first user; and
determine if the network communication causes the upload network bandwidth limit to be exceeded.

14. The device of claim 13, wherein the computer instructions are further executable to receive the network communication from the first user over a wireless network.

15. The device of claim 1, wherein the computer instructions are further executable to:
receive a network communication over a network connected to the second network interface destined for a first user from the set of users;
access a traffic control rule for the first user that includes a download network bandwidth limit for the first user; and
determine if the network communication causes the download network bandwidth limit to be exceeded.

16. The device of claim 15, wherein the computer instructions are further executable to receive the network communication from the user over a wireless network.

17. The device of claim 1, wherein the computer instructions are further executable to monitor sessions on per user basis.

18. The device of claim 1, wherein the computer instructions are further executable to:
prioritize network bandwidth allocations for networked applications for at least one user based on the corresponding user profile for that user.

19. A device for allocating network bandwidth on a per user basis comprising:
a hardware computer readable storage medium;
a set of computer instructions stored on the computer readable storage medium, executable by a processor to:
retrieve a set of user profiles, wherein each user profile corresponds to a specific user in a set of users;
establish at least one network bandwidth limit for each user in the set of users based on the corresponding user profile for that user;
for each user in the set of users, regulate network bandwidth usage associated with that user based on the at least one network bandwidth limit established for that user;
receive a network communication from a first user device communicatively coupled to the device, wherein the network communication is destined for a second device on a network communicatively coupled to the device;
retrieve a first user profile for a first user associated with the first user device from an authentication database based on user credentials provided by the first user;
initiate a control session for the first user;
based on attributes in the first user profile, establish user specific rules and conditions that are bound to the first user during the control session based on the first user device and the user credentials provided by the first user for the control session; and
dynamically update the at least one network bandwidth limit for at least one user from the set of users to account for the first user gaining access to the network.

20. The device of claim 19, wherein the computer instructions are further executable to dynamically update the at least one network bandwidth limit for each user in the set of users.

21. The device of claim 19, wherein the computer instructions are further executable to dynamically update the at least one network bandwidth limit for each user in the set of users to account for a new user connecting to the device.

22. The device of claim 19, wherein the computer instructions are further executable to dynamically update the at least one network bandwidth limit for at least one user based on a time of day.

23. The device of claim 19, wherein the computer instructions are further executable to dynamically update the at least one network bandwidth limit based on utilization averaging for the corresponding user.

24. The device of claim 19, wherein the computer instructions are further executable to dynamically update the at least one network bandwidth limit by modifying a traffic control rule containing the at least one network bandwidth limit.

25. The device of claim 19, wherein the computer instructions are further executable to meter network bandwidth usage on a per user basis.

26. The device of claim 19, wherein the computer instructions are further executable to establish a traffic control rule for each user containing the at least one network bandwidth limit for that user.

27. The device of claim 19, wherein the computer instructions are further executable to dynamically update the at least one network bandwidth limit for the at least one user by updating the traffic control rule for the at least one user.

28. The device of claim 27, wherein the computer instructions are further executable to access each traffic control rule from an IP table based on an indicator associated with each traffic control rule.

29. The device of claim 28, wherein the indicator comprises a MAC address associated with the at least one user.

30. The device of claim 28, wherein the indicator comprises an IP address associated with the at least one user.

31. The device of claim 19, wherein the computer instructions are further executable to:
access a traffic control rule for the first user that includes an upload network bandwidth limit for the first user; and
determine if the network communication causes the upload network bandwidth limit to be exceeded.

32. The device of claim 31, wherein the computer instructions are further executable to receive the network communication from the first user over a wireless network.

33. The device of claim 19, wherein the computer instructions are further executable to:
access a traffic control rule for the first user that includes a download network bandwidth limit for the first user; and
determine if the network communication causes the download network bandwidth limit to be exceeded.

34. The device of claim 33, wherein the computer instructions are further executable to receive the network communication from the first user over a wireless network.

35. The device of claim 19, wherein the computer instructions are further executable to monitor sessions on per user basis.

36. The device of claim 19, wherein the computer instructions are further executable to:

prioritize network bandwidth allocations for networked applications for at least one user based on the corresponding user profile for that user.

37. A method executing on hardware for allocating network bandwidth on a per user basis utilizing a processor comprising:
   at a control device, retrieving a set of user profiles from an authentication database, wherein each user profile corresponds to a specific user in a set of users, wherein each user profile is retrieved from the authentication database based on user credentials provided by that user in connecting to the control device through a user device associated with that user, and wherein each user profile contains an arbitrary number of attributes specifying bandwidth limitations for the corresponding specific user;
   at the control device and based on the arbitrary number of attributes in each user profile, establishing user specific rules and conditions that are bound to each user during a control session based on the user device associated with that user and the user credentials provided by that user for the control session, wherein the user specific rules include at least one network bandwidth limit for that user;
   for each user in the set of users, the control device regulating network bandwidth usage associated with that user based on the at least one network bandwidth limit established for that user; and
   at the control device, dynamically updating the at least one network bandwidth limit for at least one user from the set of users.

38. The method of claim 37, further comprising: dynamically updating the at least one network bandwidth limit for each user in the set of users.

39. The method of claim 37, further comprising:
   dynamically updating the at least one network bandwidth limit for the at least one user from the set of users to account for a new user connecting to the control device.

40. The method of claim 37, further comprising dynamically updating the at least one network bandwidth limit for at least one user based on a time of day.

41. The method of claim 37, further comprising dynamically updating the at least one network bandwidth limit based on utilization averaging for the corresponding user.

42. The method of claim 37, further comprising dynamically updating the at least one network bandwidth limit by modifying a traffic control rule containing the at least one network bandwidth limit.

43. The method of claim 37, further comprising metering network bandwidth usage on a per user basis.

44. The method of claim 37, further comprising establishing a traffic control rule for each user containing the at least one network bandwidth limit for that user.

45. The method of claim 37, further comprising dynamically updating the at least one network bandwidth limit for the at least one user by updating the traffic control rule for the at least one user.

46. The method of claim 45, further comprising accessing each traffic control rule from an IP table based on an indicator associated with each traffic control rule.

47. The method of claim 46, wherein the indicator comprises a MAC address associated with the at least one user.

48. The method of claim 46, wherein the indicator comprises an IP address associated with the at least one user.

49. The method of claim 37, further comprising:
   receiving a network communication from a first user from the set of users over a first network interface of the control device, wherein the network communication is destined for a network connected to a second network interface of the control device;
   accessing a traffic control rule for the first user that includes an upload network bandwibth limit for the user; and
   determining if the network communication causes the upload network bandwidth limit to be exceeded.

50. The method of claim 49, further comprising receiving the network communication from the first user over a wireless network.

51. The method of claim 37, further comprising:
   receiving a network communication over a network connected to a first network interface of the control device, wherein the network communication is destined for a first user from the set of users;
   accessing a traffic control rule for the first user that includes a download network bandwidth limit for the first user; and
   determining if the network communication causes the download network bandwidth limit to be exceeded.

52. The method of claim 51, further comprising further comprising receiving the network communication from the first user over a wireless network.

53. The method of claim 37, further comprising monitoring sessions on per user basis.

54. The method of claim 37, further comprising prioritizing network bandwidth allocations for networked applications for at least one user based on the corresponding user profile for that user.

55. A device comprising a set of computer instructions stored on a hardware computer readable storage medium, the hardware computer instructions when executed by a processor:
   establish user specific rules and conditions including a network bandwidth limit for the user based on attributes in a user profile for the user;
   receive a first network communication from a user device associated with the user, wherein the network communication includes user credentials of the user and device information of the user device associated with the user;
   retrieve the user profile for the user from an authentication database based on the user credentials of the user, wherein the user specific rules and conditions are bound to the user during a control session based on the device information of the user device associated with the user and the user credentials of the user provide by the user for the control session;
   determine if the first network communication causes the network bandwidth limit to be exceeded;
   if the first network communication causes the network bandwidth limit to be exceeded, drop the network communication; and
   dynamically update the network bandwidth limit for the user.

56. The device of claim 55, wherein the computer instructions are further executable to establish a traffic control rule for the user containing the network bandwidth limit.

57. The device of claim 56, wherein the computer instructions are further executable to access the traffic control rule from an IP table based on an indicator.

58. The device of claim 57, wherein the indicator comprises a MAC address and an IP address associated with the user.

59. The device of claim 55, wherein the user profile specifies network application priorities for networked applications.

60. The device of claim 55, wherein the user connects to the device via a network comprising a wireless network.

* * * * *